US008146161B2

(12) United States Patent  (10) Patent No.: US 8,146,161 B2
Jung et al.  (45) Date of Patent: *Mar. 27, 2012

(54) MULTI-NETWORK VIRUS IMMUNIZATION WITH SEPARATE PHYSICAL PATH

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US); Lowell L. Wood, Jr., Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/492,689

(22) Filed: Jul. 24, 2006

(65) Prior Publication Data

US 2007/0256129 A1  Nov. 1, 2007

Related U.S. Application Data

(63) Continuation-in-part of application No. 11/413,969, filed on Apr. 27, 2006, and a continuation-in-part of application No. 11/492,691, filed on Jul. 24, 2006.

(51) Int. Cl.
*G06F 21/00* (2006.01)
(52) U.S. Cl. ............................. 726/24; 726/22; 726/23
(58) Field of Classification Search .................. 726/24
See application file for complete search history.

(56) References Cited

U.S. PATENT DOCUMENTS

| 5,416,842 | A | 5/1995 | Aziz | |
|---|---|---|---|---|
| 5,987,610 | A * | 11/1999 | Franczek et al. | 726/24 |
| 6,081,894 | A * | 6/2000 | Mann | 713/188 |
| 6,311,277 | B1 * | 10/2001 | Takaragi et al. | 726/6 |
| 6,374,303 | B1 | 4/2002 | Armitage et al. | |
| 6,732,279 | B2 | 5/2004 | Hoffman | |
| 6,851,057 | B1 * | 2/2005 | Nachenberg | 726/24 |
| 7,010,696 | B1 | 3/2006 | Cambridge et al. | |
| 7,020,150 | B2 | 3/2006 | Ho et al. | |
| 7,093,293 | B1 | 8/2006 | Smithson et al. | |
| 7,571,483 | B1 | 8/2009 | Bascle et al. | |
| 7,647,411 | B1 | 1/2010 | Schiavone et al. | |
| 2002/0161918 | A1 | 10/2002 | Asano et al. | |
| 2002/0174358 | A1 | 11/2002 | Wolff et al. | |
| 2004/0015718 | A1 | 1/2004 | DeClouet | |
| 2004/0073701 | A1 * | 4/2004 | Huang et al. | 709/240 |
| 2004/0088564 | A1 | 5/2004 | Norman | |
| 2004/0098482 | A1 | 5/2004 | Asano | |
| 2005/0022028 | A1 | 1/2005 | Hall | |
| 2005/0050378 | A1 * | 3/2005 | Liang | 714/4 |

(Continued)

OTHER PUBLICATIONS

Distributive immunization of networks—Dec. 2005—pp. 1-5.*

(Continued)

*Primary Examiner* — David Garcia Cervetti
*Assistant Examiner* — Ghazal Shehni

(57) ABSTRACT

An apparatus, device, methods, computer program product, and system are described that determine a virus associated with a communications network, and distribute an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network.

31 Claims, 20 Drawing Sheets

U.S. PATENT DOCUMENTS

| | | | |
|---|---|---|---|
| 2005/0086499 | A1 | 4/2005 | Hoefelmeyer et al. |
| 2005/0120231 | A1 | 6/2005 | Harada et al. |
| 2005/0182949 | A1 | 8/2005 | Phillips et al. |
| 2005/0198519 | A1 | 9/2005 | Tamura et al. |
| 2005/0204150 | A1 | 9/2005 | Peikari |
| 2005/0288961 | A1 | 12/2005 | Tabrizi |
| 2005/0289649 | A1 | 12/2005 | Mitomo et al. |
| 2006/0031940 | A1 | 2/2006 | Rozman et al. |
| 2006/0048228 | A1 | 3/2006 | Takemori et al. |
| 2006/0072527 | A1 | 4/2006 | Beck et al. |
| 2006/0095961 | A1* | 5/2006 | Govindarajan et al. ......... 726/15 |
| 2006/0095965 | A1 | 5/2006 | Phillips et al. |
| 2006/0190606 | A1 | 8/2006 | Kohavi |
| 2006/0218635 | A1 | 9/2006 | Kramer et al. |
| 2007/0002838 | A1 | 1/2007 | Komura et al. |
| 2007/0101422 | A1 | 5/2007 | Carpenter |
| 2007/0101430 | A1* | 5/2007 | Raikar ............................ 726/24 |
| 2007/0250931 | A1 | 10/2007 | Takahashi |
| 2007/0294759 | A1 | 12/2007 | Browne |
| 2008/0005784 | A1 | 1/2008 | Miliefsky |

OTHER PUBLICATIONS

Bontchev, Vesselin; "Are 'Good' Computer Viruses Still a Bad Idea?"; pp. 1-29; University of Hamburg; located at: http://vx.netlus.ort/lib/avb02.html; printed on: Mar. 1, 2006.

"Cisco—MPLS FAQ for Beginners"; Bearing dates of 1992-2006 and May 8, 2006; pp. 1-7; Cisco Systems, Inc.; printed on May 21, 2006; located at: http://www.cisco.com/warp/public/105/mpls_faq_4649.shtml.

Goldenberg et al.; "Distributive immunization of networks against viruses using the 'honey-pot' architecture"; Bearing a date of Dec. 1, 2005; pp. 1-5; Nature Physics.

Somayaji et al.; "Principles of a Computer Immune System"; Department of Computer Science, University of New Mexico; Bearing dates of 1997 & 1998; pp. 75-82; New Security Paradigms Workshop; located at: http://www.cs.unm.edu/~immsec/publications/nspw-97.pdf.

PCT International Search Report; International App. No. PCT/US07/14564; Mar. 26, 2008; pp. 1-2.

PCT International Search Report; International App. No. PCT/US07/10140; May 8, 2008; pp. 1-2.

PCT International Search Report; International App. No. PCT/US07/14579; Jun. 20, 2008; pp. 1-2.

U.S. Appl. No. 11/601,605, Jung et al.
U.S. Appl. No. 11/526,213, Jung et al.
U.S. Appl. No. 11/526,062, Jung et al.
U.S. Appl. No. 11/513,901, Jung et al.
U.S. Appl. No. 11/487,595, Jung et al.
U.S. Appl. No. 11/486,975, Jung et al.
U.S. Appl. No. 11/474,523, Jung et al.

Chinese Patent Office official action; App. No. 200780015273.1 based on PCT/US07/010140; Aug. 24, 2010; pp. 1-6.

* cited by examiner

MULTI-NETWORK VIRUS IMMUNIZATION WITH SEPARATE PHYSICAL PATH

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation in part of currently co-pending United States patent application entitled MULTI-NETWORK VIRUS IMMUNIZATION, naming Edward K.Y. Jung; Royce A. Levien; Robert W. Lord; Mark A. Malamud; John D. Rinaldo, Jr.; and Lowell L. Wood Jr. as inventors, U.S. Ser. No. 11/413,969 filed 27 Apr. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at "http://www.uspto.gov/web/offices/com/sol/og/2003/week11/patbene.htm." The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

2. For purposes of the USPTO extra-statutory requirements, the present application constitutes a continuation in part of currently co-pending United States patent application entitled MULTI-NETWORK VIRUS IMMUNIZATION WITH TRUST ASPECTS, naming Edward K.Y. Jung; Royce A. Levien; Robert W. Lord; Mark A. Malamud; John D. Rinaldo, Jr.; and Lowell L. Wood Jr. as inventors, U.S. patent application Ser. No. 11/492,691, filed 24 Jul. 2006, which is currently co-pending, or is an application of which a currently co-pending application is entitled to the benefit of the filing date.

SUMMARY

An embodiment provides a method. In one implementation, the method includes but is not limited to determining a virus associated with a communications network, and distributing an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for determining a virus associated with a communications network, and the signal bearing medium bearing one or more instructions for distributing an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to determine a virus associated with a communications network, and distribute an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. In addition to the foregoing, other system aspects are described in the claims, drawings, and text forming a part of the present disclosure.

An embodiment provides a device. In one implementation, the device includes but is not limited to a multi-network virus immunization system, and the multi-network virus immunization system includes but is not limited to a network monitor operable to determine a virus associated with a communications network, and a response generator operable to distribute an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. In addition to the foregoing, other device aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

The use of the same symbols in different drawings typically indicates similar or identical items.

DETAILED DESCRIPTION

Figure 1:
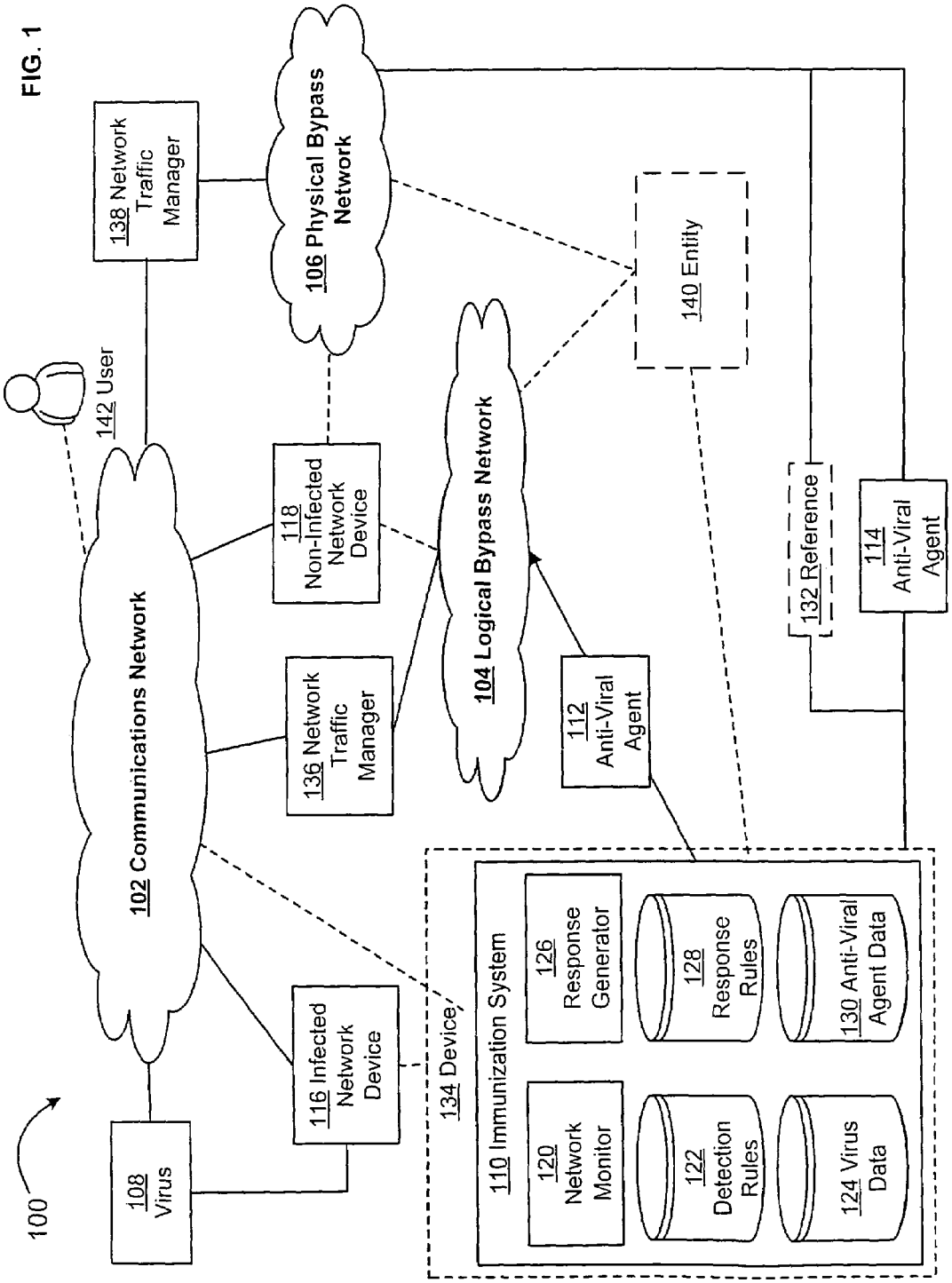
FIG. 1 illustrates an example multi-network virus immunization system in which embodiments may be implemented, perhaps in a device.

FIG. 1 illustrates an example multi-network virus immunization system 100 in which embodiments may be implemented. In the example of FIG. 1, the multi-network virus immunization system 100 is operable, for example, to prevent or reduce damage caused by malicious software code, or otherwise limit a propagation and/or replication of any undesired code or behavior within a computer network. For example, the multi-network virus immunization system 100 may be operable to limit propagation/replication of undesired code within a first network by initiating a competing and inherently-advantaged propagation/replication of desired code, using a second network.

In the example of FIG. 1, an example of such a first network is illustrated as a communications network 102. The communications network 102 may include, for example, virtually any computer network over which users and/or network devices may conduct a mutually-desirable exchange of information, where such mutually-desirable information may include and/or be referred to as communications data. For example, such communications data may include voice or e-mail traffic that is desired by both a sending and a receiving party, or may include a file transfer (including, for example, a video and/or audio file transfer) desired by both a sending and a receiving party. The communications network 102 may include, for example, a virtual local area network, a virtual private network (VPN), and/or a corporate intranet, and, in such examples, may be implemented as part of (e.g., as a subset of) a larger network, such as, for example, the public Internet. Other examples of the communications network 102 and of communications data are provided in more detail, herein.

Further in the example of FIG. 1, an example of the second network referenced above as part of the multi-network virus immunization system 100 may include a logical bypass network 104 and/or a physical bypass network 106, and/or other example(s) of a bypass network(s), as described in more detail, herein. For example, the logical bypass network 104 may include a computer network that is at least partially logically separate from the communications network 102 (e.g., at least one or more segments of the logical bypass network 104 may be logically separate from the communications network 102). For example, the communications network 102 and the logical bypass network 104 may both be implemented on an identical set (or sub-set(s)) of computing devices that are physically connected to one another, but that implement different network protocols, or that implement different instances of the same or similar network protocols, or that are implemented at different layers of a protocol stack, or are otherwise logically-separated from one another.

For instance, a computer that is common to both the communications network 102 and the logical bypass network 104 may be assigned a first Internet Protocol (IP) address on the communications network 102, and a second IP address on the logical bypass network 104. It should be understood that computers common to the communications network 102 and to the logical bypass network 104 may share a common hub or switch, or other network device(s), but may nonetheless represent logically-separate networks that are generally incapable of communicating with one another without some type of translation or mediation therebetween. For example, as discussed in more detail herein, such translation and/or mediation may occur at a router or gateway that connects the communications network 102 and the logical bypass network 104.

The physical bypass network 106 represents, for example, a network that is at least partially physically separate from the communications network 102. For example, the physical bypass network 106 may include computers or other network devices that are different physical devices than those found on the communications network 102, and/or that communicate using different (types of) transmission media and/or techniques, and/or that are configured using a physically distinct network topology. For example, where the communications network 102 may include one or more local area networks (LANs) connected together in a wired fashion (e.g., using Ethernet and/or fiber), the physical bypass network 106 may include a satellite-based network, or a cellular network, or some other physically separate network, examples of which are discussed in more detail, herein.

Of course, although the example of FIG. 1 illustrates the logical bypass network 104 and the physical bypass network 106, it should be understood that these are merely intended as non-limiting examples, and that additional or alternative examples of bypass network(s) may be used in the multi-network immunization system 100. Further, although both the logical bypass network 104 and the physical bypass network 106 are illustrated in FIG. 1, it should be clear that, in any given implementation of the multi-network immunization system 100 (such as those described herein), only one such bypass network may be used.

As referenced herein, the logical bypass network 104 and/or the physical bypass network 106 may be used to prevent or reduce a propagation/replication of undesired code or behavior on the communications network 102. In the example of FIG. 1, a virus 108 is illustrated that represents and includes any such undesired code or behavior, including but not limited to, for example, malicious code that is created and/or distributed within the communications network 102 by a party desiring to harm or otherwise inconvenience users of the communications network 102. For example, the virus 108 may include self-replicating and/or self-propagating (and perhaps evolving) code that may infect network devices of the communications network 102, so as, for example, to destroy, modify, or create data on such network device(s). More generally, the virus 108 may represent and include virtually any code that attacks a confidentiality, integrity, availability, accountability, and/or accuracy of a device and/or transmission of the communications network 102. Even more generally, the virus 108 need not be malicious in the sense(s) just referenced, but may simply be undesired on the communications network 102 by an administrator or other user of the communications network 102. Further examples of the virus 108 are provided in more detail, herein.

An immunization system 110 is illustrated in the example of FIG. 1 that is operable to determine the virus 108 that is associated with the communications network 102. The immunization system 110 is further operable to distribute an anti-viral agent 112 and/or an anti-viral agent 114 onto the communications network 102 using a bypass network, e.g., the logical bypass network 104 and/or the physical bypass network 106. The logical bypass network 104 and/or the physical bypass network 106 is/are configured to provide transmission of the anti-viral agent 112 and/or the anti-viral agent 114 with at least one of a higher transmission speed, a higher transmission reliability, a higher transmission security, and/or a physically-separate transmission path, relative to transmission of the virus 108 on the communications network 102. In this way, the virus 108 may be prevented or limited from spreading or existing on the communications network 102.

In this regard, it should be understood that the virus 108 may replicate, exist, and/or propagate on the communications network 102 in a manner(s) that may be very fast and/or difficult to detect and/or destroy. In fact, in many cases, the virus 108 may be specifically engineered to be difficult to contain within the communications network 102. For example, the virus 108 may spread in a multi-cast or broadcast fashion, and may infect devices of the communications network 102 in a virtually exponential progression. In other examples, the virus 108 may be designed to infect devices of the communications network 102 and to take no action on an infected network device 116 of the communications network 102, at least initially, while the virus 108 spreads to a larger number of network devices. Then, the virus 108 may execute (e.g., after some pre-designated time or signal), so that a large number of already-infected and damaged devices are determined at once. Thus, in many cases, the virus 108 may have an inherent advantage (e.g., a "head-start") in propagating on the communications network 102, particularly since, for example, a curative or mitigating response to the virus 108 often may not be developed with sufficient specificity and effectiveness until the virus 108 is sufficiently examined and analyzed.

The multi-network virus immunization system 100 thus uses a bypass network, such as the logical bypass network 104 and/or the physical bypass network 106, to provide an alternate, out-of-band, or otherwise advantageous channel and/or path for transmission of the anti-viral agent 112 (and/or the anti-viral agent 114). As described herein, one or more characteristics and/or metrics of such bypass network(s) may enable distribution of the anti-viral agent(s) 112, 114 in an advantageous manner that enhances an effectiveness thereof in preventing or limiting the virus 108 on the communications network 102.

For example, the logical bypass network 104 may provide transmission of the anti-viral agent 112 to a non-infected network device 118 of the communications network 102 with a greater transmission speed, lower latency, effective speed, and/or faster delivery time than provided by the communications network 102 in delivering the virus 108 from the infected network device 116 to the non-infected network device 118. More generally, as the virus 108 spreads through the communications network 102, the immunization system 110 may use the logical bypass network 104 to distribute the anti-viral agent 112 ahead of the spreading of the virus 108. In this way, the anti-viral agent 112 may immunize non-infected (e.g., not-yet infected) network devices of the communications network 102, including the non-infected network device 118, against the virus 108. Accordingly, the spread of the virus 108 on the communications network 102 may be slowed or stopped, as fewer and fewer network devices on the communications network 102 are available as possible hosts for the virus 108.

Similar comments apply to the physical bypass network 106 in distributing the anti-viral agent 114. Moreover, as described herein, other characteristics and/or metrics associated with the physical bypass network 106 (and/or the logical bypass network 104) may be utilized in distributing the anti-virus agent 114 (and/or the anti-virus agent 112) on the communications network 102. For example, the physical bypass network 106 may provide transmission of the anti-viral agent 114 with a greater reliability and/or greater security than is available to the communications network 102 in transmitting the communications data and/or the virus 108. Greater reliability in this sense may include, for example, point-to-point and/or end-to-end reliability in transmitting the anti-viral agent 114 than is available to the communications network 102. Similarly, greater security may include, for example, greater point-to-point and/or end-to-end security (e.g., encryption). By using an effectively higher reliability and/or security, the physical bypass network 106 may increase the probability or expectation that the anti-viral agent 114 may be delivered to the communications network 102 in a way that is effective in stopping or otherwise limiting the spread of the virus 108.

In some example implementations, the anti-viral agent(s) 112, 114 also may be self-replicating and/or self-propagating. Thus, once deployed onto the communications network 102, the anti-viral agents 112, 114 may spread to a plurality of non-infected devices thereof, so that such non-infected devices may be rapidly immunized against the spread of the virus 108. Due to the advantage(s) provided by the characteristics of the logical bypass network 104 and the physical bypass network 106, respectively, the anti-viral agents 112, 114 may compensate for, or overcome, any advantages experienced by the virus 108 in propagating on the communications network 102, and may therefore be effective in stopping or otherwise limiting the propagation of the virus 108.

In the example of FIG. 1, the immunization system 110 includes a network monitor 120 that is operable to determine the virus 108 on the communications network 102. For example, the network monitor 120 may detect and/or identify the virus 108, by, for example, implementing detection rules 122, and/or using known virus data 124. For example, the detection rules 122 may specify parameters for selecting and scanning network devices of the communications network 102 (e.g., which or how many network devices should be scanned, and with what frequency), and the network monitor 120 may implement these and/or other examples of the detection rules 122. The network monitor 120 also may determine the virus 108 using known virus data 124, e.g., by comparing a signature of the virus 108 with known virus signatures stored therein, according to the detection rules 122. Various other examples of the nature and operation of the network monitor 120, the detection rules 122, and the virus data 124 are provided in more detail, herein.

The immunization system 110 also includes a response generator 126 that is operable to communicate with the network monitor 120 to generate a response to the virus 108. The response generator 126 may act according to response rules 128 that may govern, for example, a creation of the anti-viral agents 112, 114 and/or a distribution of the anti-viral agents 112, 114 using the logical bypass network 104 and/or the physical bypass network 106. For example, the response generator 126 may use the response rules 128 to determine which of the logical bypass network 104 and the physical bypass network 106 to use (in a case where both are available), or where and how to inject the anti-viral agents 112, 114 onto the communications network 102. The response rules 128 also may govern a manner in which the response generator 126 uses anti-viral agent data 130 to create, distribute, or otherwise provide the virus 108. For example, the response generator 126 may select from several possible anti-viral agents and/or distribution strategies available in the anti-viral agent data 130, based on information provided by the network monitor 120 and/or based on the response rules 128.

As another example, the response generator 126 may provide the anti-viral agent 114 by first distributing a reference 132 to the anti-viral agent 114 on the communications network 102, using the physical bypass network 106. For example, the reference 132 may include a pointer, link, or other identifier of the anti-viral agent 114, so that, for example, the non-infected network device 118 may obtain or otherwise access the actual anti-viral agent 114 itself, e.g., from the anti-viral agent data 130. Various other examples of the nature and operation of the response generator 126, the response rules 128, and/or the anti-viral agent data 130 are provided in more detail, herein.

In FIG. 1, the immunization system 110 is illustrated as being implemented on a (single, generic) device 134, which may represent virtually any computing device(s) capable of executing the functions and features described herein, including, for example, a desktop computer, a workstation computer, a server, a personal digital assistant (PDA) or cell phone, a laptop computer, a tablet personal computer, a networked computer, or a computing system comprised of a cluster of processors. Further, the immunization system 110 may be implemented in whole or in part on (or in association with) the infected network device 116, the non-infected network device 118, a network traffic manager 136 associated with the communications network 102 and the logical bypass network 104, or a network traffic manager 138 between the communications network 102. For example, the network traffic managers 136, 138 may include router(s), gateway(s), firewall(s), or other devices for implementing network policies and/or managing network traffic.

For example, the network traffic manager 136 may represent a router that provides translation between the communications network 102 and the logical bypass network 104, and that may be present on both of the communications network 102 and the logical bypass network 104. In some such example implementations, the network traffic manager 136 may implement the network monitor 120 and the detection rules 122 to detect the virus 108 on the communications network, and/or may implement the response generator 126 and/or the response rules 128 to distribute the anti-viral agent 112.

For example, the network traffic manager 136 may include a tag-prioritized router (e.g., implementing Multiprotocol Label Switching (MPLS)) that is operable to recognize and prioritize network traffic that is tagged as being associated with the anti-viral agent 112. For example, the top "n" tags of network traffic may be reserved on the network traffic manager 136 as being associated with the anti-viral agent 112. In this way, for example, the anti-viral agent 112 may be provided ahead of the virus 108 on the communications network 102, even when the communications network 102 and the logical network 104 share the same computing devices and/or network traffic manager(s).

Also in FIG. 1, an entity 140 is illustrated as owning, assuring, guaranteeing, providing, or otherwise sponsoring the logical bypass network 104 and/or the physical bypass network 106. Although not directly illustrated in FIG. 1, it should be understood that the entity 140, or a different entity (not shown in FIG. 1) may sponsor the communications network 102, as well. Accordingly, the entity 140 may be responsible for implementing some or all of the immunization system 110 in conjunction with one or more of the communications network 102, the logical bypass network 104, the physical bypass network 106, and/or the network traffic managers 136, 138.

For example, the entity 140 may represent one or more of a network service provider or an antiviral service provider, and/or may represent a third-party entity that billing or other services associated with defining or providing the communications network 102 on behalf of a network service provider (e.g., may provide the communications network 102 as a virtual private network (VPN) having defined or desired characteristics or users, in exchange for a fee(s)). As such, (access to) one or more of the communications network 102, the logical bypass network 104, and/or the physical bypass network 106, may be provided in conjunction with a service level agreement (SLA) between the entity and a recipient/user of one or more of the communications network 102, the logical bypass network 104, and/or the physical bypass network 106. Thus, one or more of the communications network 102, the logical bypass network 104, and/or the physical bypass network 106 may be considered to be a managed network, e.g., managed by the entity 140. As such, one or more of the communications network 102, the logical bypass network 104, and/or the physical bypass network 106 may be operated essentially independently of one another and/or using separate/distinct management consoles.

Thus, as should be understood from the description provided herein, a user 142 may be provided with (or provided with access to) one or more of the communications network 102, the logical bypass network 104, and/or the physical bypass network 106. The user 142 may include, for example, a single consumer, employee, service provider, or other person(s), or may represent a corporation or other entity (e.g., a corporation providing the communications network 102 to employees as part of a corporate intranet).

Accordingly, the user 142 may obtain the benefit(s) of one or more of the communications network 102, the logical bypass network 104, and/or the physical bypass network 106, in exchange for payment provided to the entity 140. In this context, payment may refer generally to any type of monetary compensation, and/or non-monetary compensation, and/or economic value exchange. By way of example and not limitation, a payment may include a non-monetary payment, including a reduced or eliminated cost to the user 142, in exchange for a granting of certain rights or permissions to the entity 140 (such as, for example, granting the entity 140 rights to certain information of the user 142, including personal information of the user 142 for maintaining in a database for marketing or research purposes).

Figure 2:
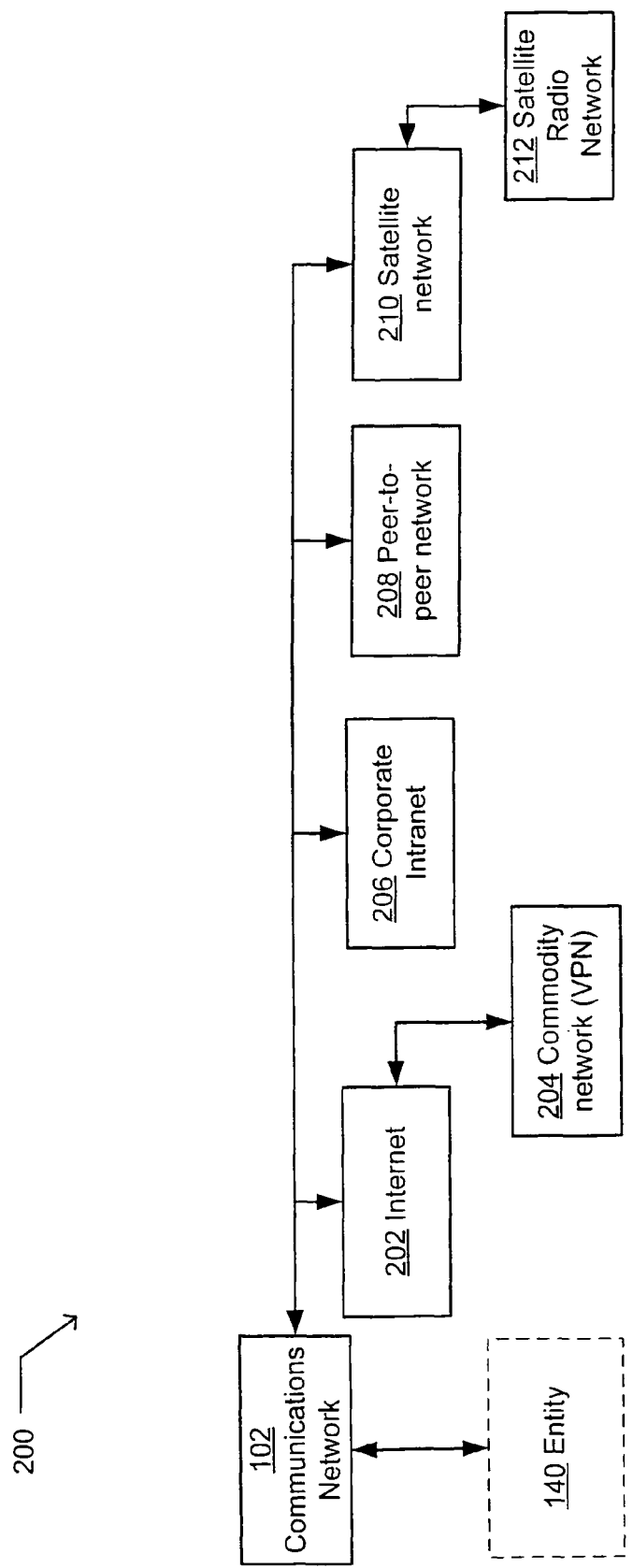
FIG. 2 illustrates example embodiments of a communications network of the multi-network virus immunization system of FIG. 1.

FIG. 2 illustrates example embodiments of the communications network of the multi-network virus immunization system of FIG. 1. In FIG. 2, the communications network 102 is illustrated as potentially including one or more of the public internet 202, a subset of the public internet 202 such as a commodity network 204 (e.g., a VPN), a corporate intranet 206, a peer-to-peer network 208, a satellite network 210, or a specific type of the satellite network 210 such as a satellite radio network 212. Of course, the examples in FIG. 2 are non-limiting examples of the communications network 102, and many other examples and implementations may be used. As should be understood from the description provided herein, the entity 140 may be associated with providing, or providing access to, one or more of the example networks 202-212 illustrated in FIG. 2.

Figure 3:
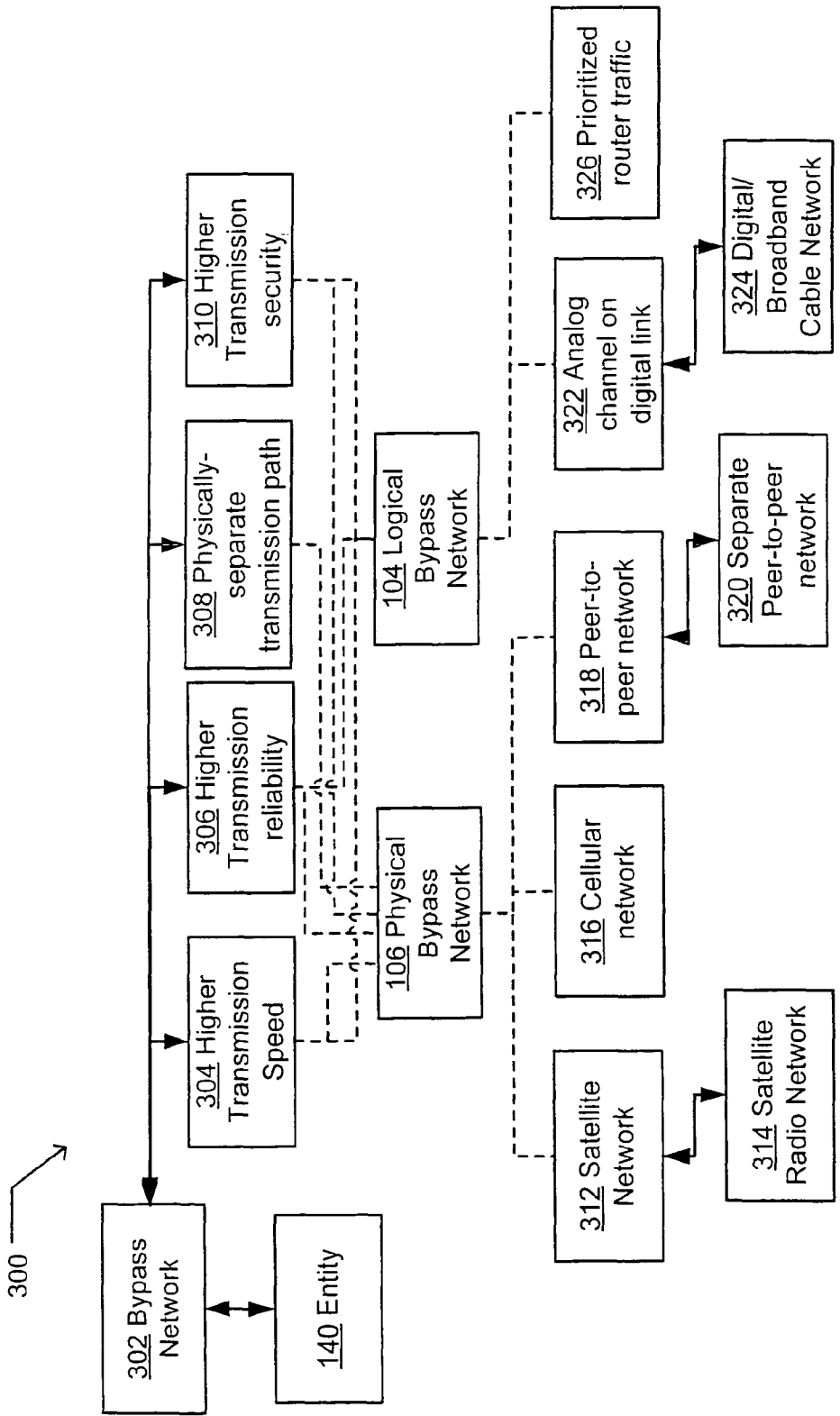
FIG. 3 illustrates example embodiments of bypass network(s) of the multi-network virus immunization system of FIG. 1.

FIG. 3 illustrates example embodiments of the bypass network(s) 104, 106 of the multi-network virus immunization system of FIG. 1. FIG. 2 illustrates a bypass network 302 that should be understood to represent or include one or both of the logical bypass network 104 and/or the physical bypass network 106, and/or another bypass network(s). As shown, and described in more detail herein, the bypass network 302 may be configured to provide one or more of a higher transmission speed 304, a higher transmission reliability, and/or a physically-separate transmission path 308, and a higher transmission security 310 relative to transmission of the virus 108 on the communications network 102.

In so doing, and as just referenced, the bypass network 302 may use the physical bypass network 106 and/or the logical bypass network 104. In FIG. 3, examples of the physical bypass network 106 are illustrated as including one or more of a satellite network 312 (including, potentially, a satellite radio network 314), a cellular network 316, or a peer-to-peer network 318 (including potentially, a separate peer-to-peer network 320 that may be provided in conjunction with, but separately or independently from, the communications network 102, e.g., the peer-to-peer network 208).

Further in FIG. 3, the logical bypass network 104 is illustrated as including an analog channel on a digital link 322, including, for example, an analog channel on a digital/broadband cable network 324. The logical bypass network 104 also may include prioritized router traffic, such as, for example, the prioritized router traffic described herein with respect to the network traffic manager 136.

The entity 140 is illustrated in FIG. 3 as sponsoring or otherwise providing (or providing access to) the bypass network 302. Of course, it should be understood that the entity 140 may represent one or more entities, and that a different entity may sponsor or provide the communications network 102 than the entity that provides the bypass network 302.

Further in FIG. 3, the networks 104, 106, and 304-324 are illustrated with dashed lines to illustrate examples of how the bypass network 302 may be provided. Of course, again, the illustrated connections are merely illustrative, and are not limiting as to how the bypass network(s) may be connected, inter-connected, or otherwise provided.

Figure 4:
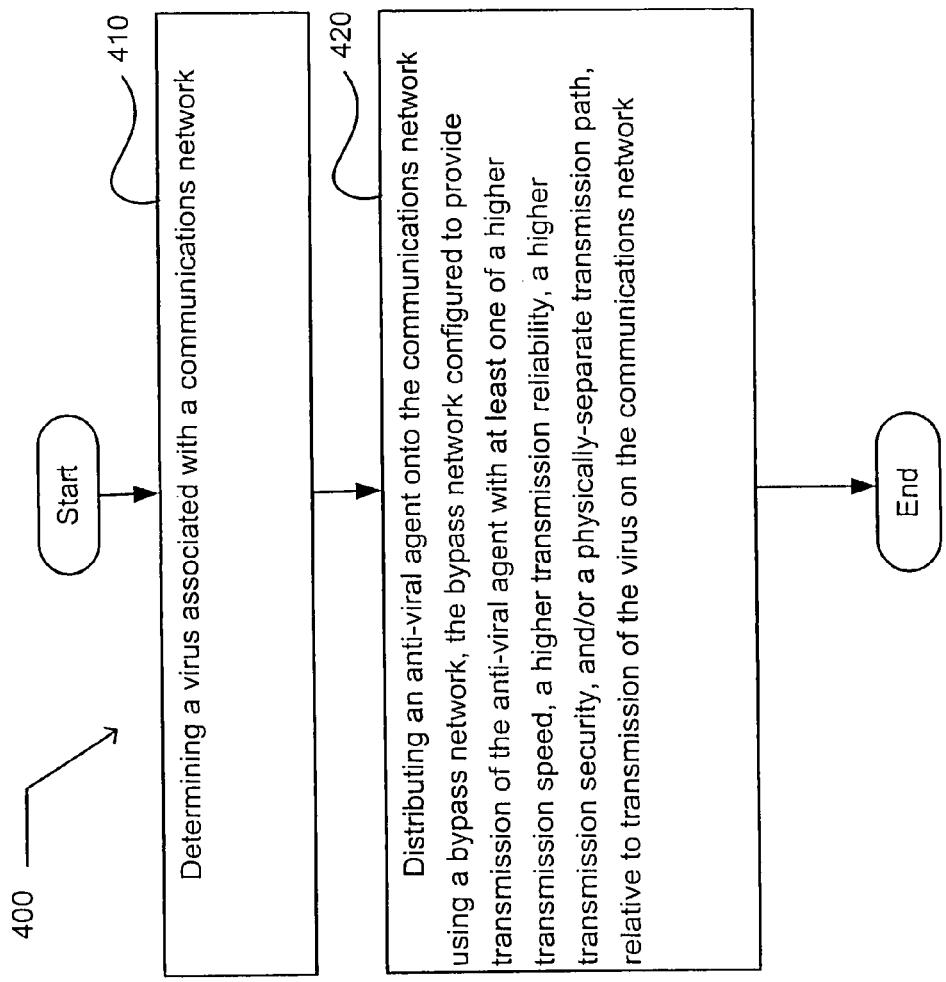
FIG. 4 illustrates an operational flow representing example operations related to techniques for multi-network virus immunization.

FIG. 4 illustrates an operational flow 400 representing example operations related to techniques for multi-network virus immunization. In FIG. 4 and in following figures that include various examples of operational flows, discussion and explanation may be provided with respect to the above-described examples of FIGS. 1-3, and/or with respect to other examples and contexts. However, it should be understood that the operational flows may be executed in a number of other environments and contexts, and/or in modified versions of FIGS. 1-3. Also, although the various operational flows are presented in the sequence(s) illustrated, it should be understood that the various operations may be performed in other orders than those which are illustrated, or may be performed concurrently.

After a start operation, the operational flow 400 moves to a determining operation 410 in which a virus associated with the communications network may be determined. For example, as shown in FIG. 1, the network monitor 120 of the immunization system 110 may be operable to monitor the communications network 102, e.g., according to the detection rules 122, in order to detect the virus 108 associated with the communications network 102. In other examples, the virus 108 may represent a potential virus and/or a virus that is thought (without certainty) to exist, and may be determined to be associated with the communications network in the sense that the communications network 102 is particularly susceptible to a type of the (potential) virus 108. In such cases, the virus 108 may not yet exist, or may not yet actually be distributed onto the communications network 102 (e.g., a malicious provider of the virus 108 may merely have threatened distribution of the virus 108).

Then, in a distributing operation 420, an anti-viral agent may be distributed onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. For example, the immunization system 110 may distribute the anti-viral agent 112 to the communications network 102 using the logical bypass network 104, where the logical bypass network 104 may provide the anti-viral agent 112 to the communications network 102 using the network traffic manager 136 and/or the non-infected network device 118. In another example, the immunization system 110 may distribute the anti-viral agent 114 to the communications network 102 using the physical bypass network 106, where the physical bypass network 106 may provide the anti-viral agent 114 to the communications network 102 using the network traffic manager 139 and/or the non-infected network device 118. In a more specific example, the response generator 126 may be operable to (a) create, formulate, or obtain the anti-viral agents 112, 114, (b) determine an optimal bypass network(s) for distribution of the anti-viral agents 112, 114 (e.g., determine characteristics of the logical bypass network 104 and/or the physical bypass network 106 that are best-suited for distributing the anti-viral agents 112, 114 and limiting the virus 108), and (c) determine a distribution strategy for distributing the anti-viral agents 112, 114 onto the communications network 102 (e.g., distributing the anti-viral agents 112, 114 onto a network device of the communications network 102 that has a high degree of connectivity within the communications network 102 and therefore provides for rapid dissemination of the anti-viral agents 112, 114.

As a result of the operations 410-420, operation(s) may be performed that are related either to a local or remote storage of digital data, or to another type of transmission of digital data. As discussed herein, in addition to accessing, querying, recalling, or otherwise determining the digital data for the determining operation 410 and/or the distributing operation 420, operations may be performed related to storing, assigning, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 5:
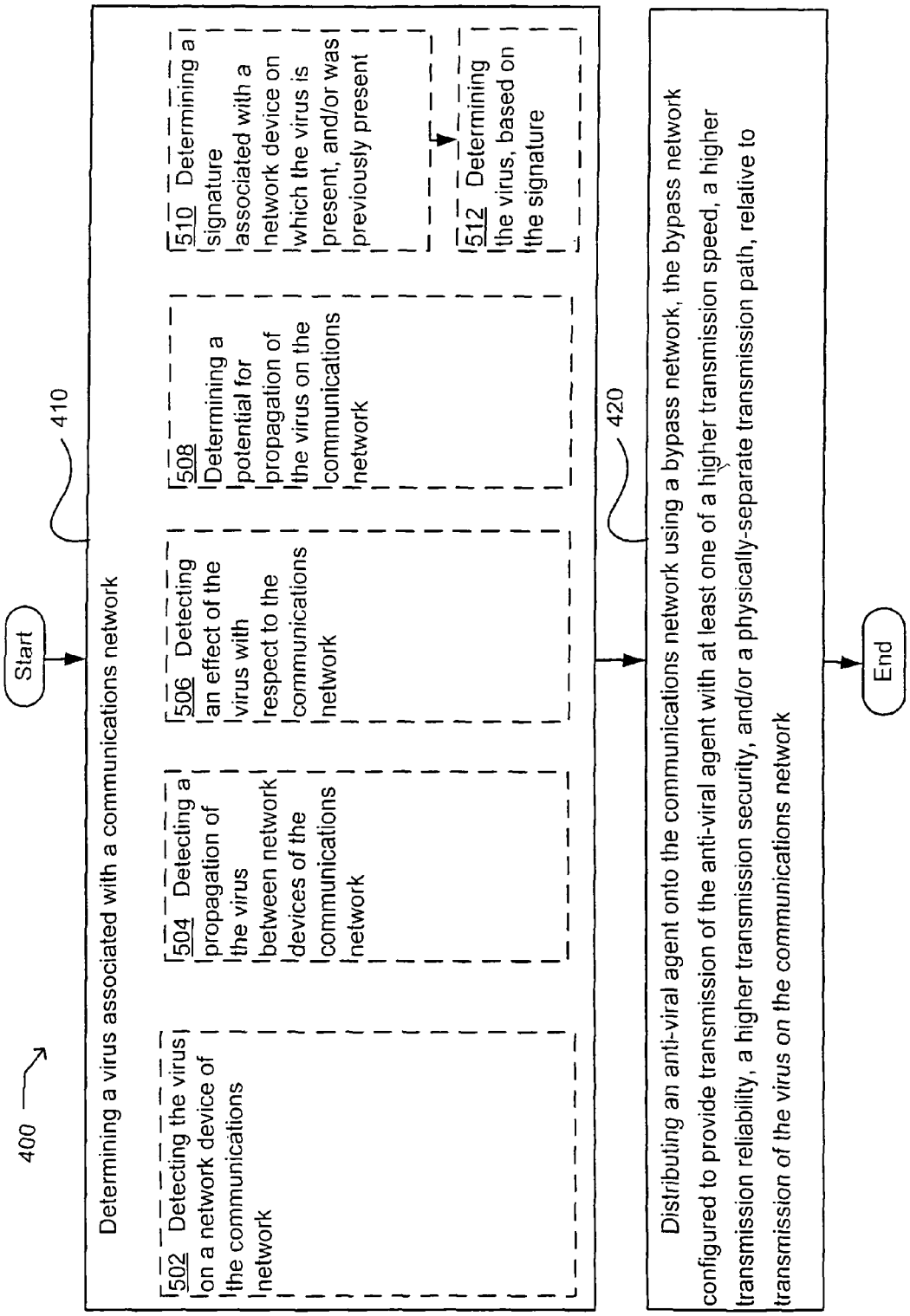
FIG. 5 illustrates an alternative embodiment of the example operational flow of FIG. 4.

FIG. 5 illustrates alternative embodiments of the example operational flow 400 of FIG. 4. FIG. 5 illustrates example embodiments where the determining operation 410 may include at least one additional operation. Additional operations may include an operation 502, an operation 504, an operation 506, an operation 508, an operation 510, and/or an operation 512.

At the operation 502, the virus may be detected on a network device of the communications network. For example, the virus 108 may be sent as, or in association with, an e-mail to the (infected) network device 116 of the communications network 102, and the user 142 may open the e-mail to enable the virus 108 to infect the (infected) network device 116. Then, for example, the network monitor 120 of the immunization system 110 may detect the virus 108 on the infected network device 116 of the communications network 102, e.g., by comparing the virus 108 (or a header, payload, and/or signature thereof) against virus data 124, in accordance with the detection rules 122. In such examples, the network monitor 120 may be implemented as an anti-viral program running on the infected network device 116, and/or may represent an anti-viral program running on a separate device (e.g., the device 134) that detects the virus 108 (including multiple instances thereof) on a plurality of network devices of the communications network 102.

At the operation 504, a propagation of the virus may be detected between network devices of the communications network. For example, where the virus 108 has infected the infected network device 116 of the communications network 102, the virus 108 may, for example, propagate using the communications network 102 to (attempt to) reach the non-infected network device 118. During such propagation, which may occur, for example, over the network traffic manager 136/138 the network monitor 120 of the immunization system 110 may detect the virus 108 using the detection rules 122. Again, in the latter example, the network-monitor 120 and/or the immunization system 110 as a whole may be implemented on the network traffic manager 136/138, or partially or wholly separate therefrom.

At the operation 506, an effect of the virus with respect to the communications network may be detected. For example, the virus 108 may have an effect such as slowing or preventing some or all transmission of communications data on the communications network 102 by some measurable amount. In such cases, for example, the network monitor 120 of the immunization system 110, perhaps using the detection rules 122, may detect the slowing effect of the virus 108. In an additional or alternative example, the virus 108 may have the effect of disabling access to the e-mail program (or some other application) of the infected network device 116, or may delete certain files from the infected network device 116. In such an example(s), again, the network monitor 120 may detect (e.g., infer a presence of) the virus 108 on the infected network device 116, e.g., by applying the detection rules 122.

At the operation 508, a potential for propagation of the virus on the communications network may be determined. For example, the virus 108 may be known to infect communications networks with a particular security shortcoming or loophole. Thus, in a case where the communications network 102 is associated with the security shortcoming/loophole, it may be determined that the communications network 102 is susceptible to the virus 108, e.g., that there may be a potential for propagation of the virus 108 on the communications network 102.

At the operation 510, a signature associated with a network device on which the virus is present and/or was present may be determined. For example, the virus 108 may have a known signature (which may be stored in the virus data 124), and may infect the infected network device 116. Monitoring of the infected network device 116 may provide observation or determination of such a signature, which may be considered, for example, to be an "epitopic signature" that is analogous to human immune responses for identifying a post-infected body part. The network monitor 120 of the immunization system 110 may thus determine the signature. Then, at the operation 512, the virus 108 may be determined based on the signature. In continuing the example just given, the network monitor 120 of the immunization system 110 may thus use the detection rules 122 to determine that the signature of the operation 510 is, in fact, the signature of the virus 108. It should be understood that the virus 108 need not be determined with any particular degree of specificity. For example, the network monitor 120 may simply determine (e.g., based on a checksum of key code received from the infected network device 116) that the infected network device 116 is suspicious (e.g., due to a non-matching checksum). As a result, particularly when aggregated with similar results obtained from other network devices, the virus 108 may be recognized at some level, and attacks using the virus 108 (e.g., denial-of-service attacks in which the virus 108 causes the infected network device(s) 116 to flood a host device with service requests so as to block access to the host for other network devices) may be thwarted. For example, the host device may stop accepting requests from network devices suspected of being involved in the attack. It should be understood, of course, that the signature (e.g., checksum) may be provided to the host device using the logical bypass network 104 and/or the physical bypass network 106.

Figure 6:
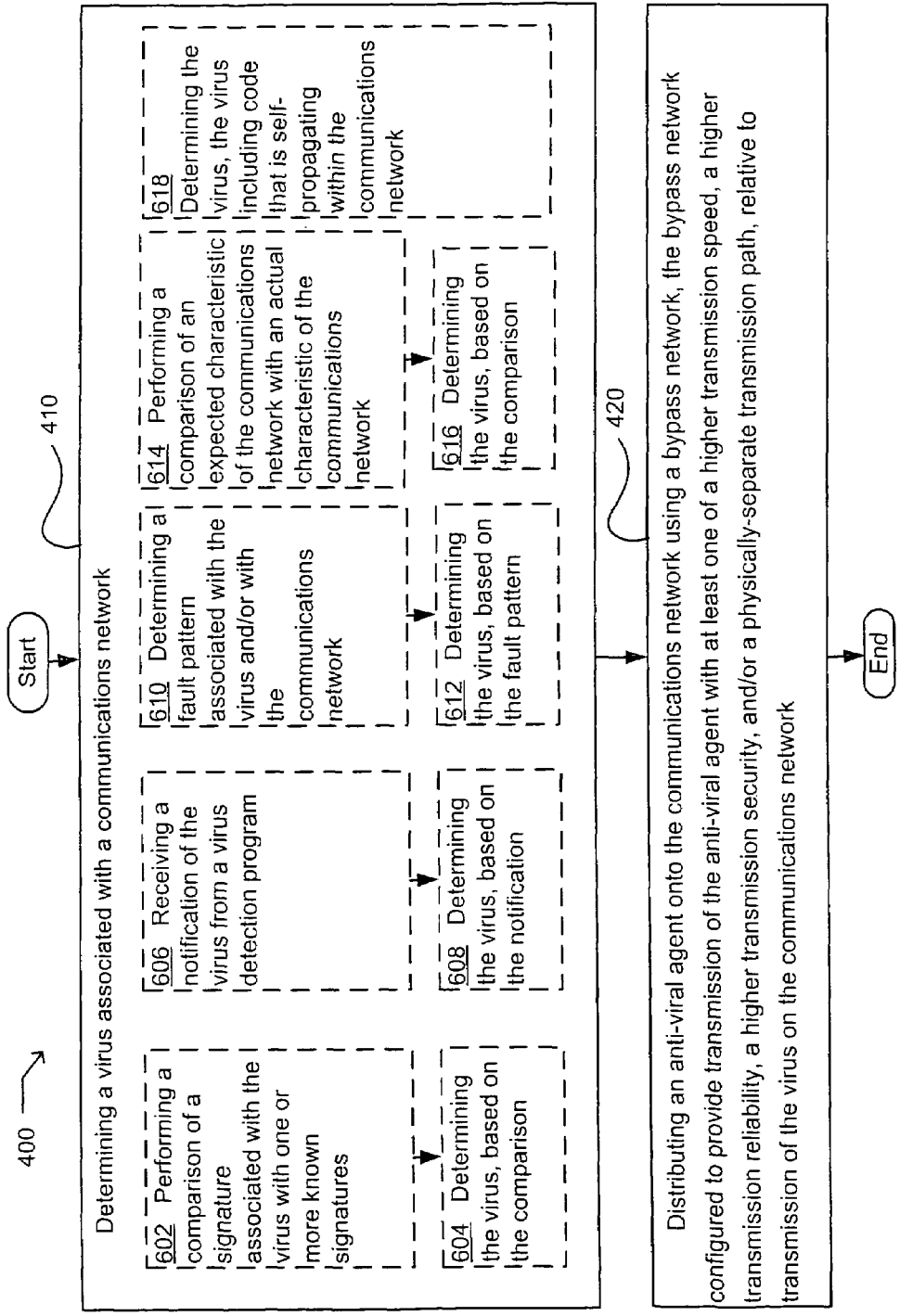
FIG. 6 illustrates an alternative embodiment of the example operational flow of FIG. 4.

FIG. 6 illustrates alternative embodiments of the example operational flow 400 of FIG. 4. FIG. 6 illustrates example embodiments where the determining operation 410 may include at least one additional operation. Additional operations may include an operation 602, an operation 604, an operation 606, an operation 608, an operation 610, an operation 612, an operation 614, an operation 616, and/or an operation 618.

At the operation 602, a comparison may be performed of a signature associated with the virus with one or more known signatures. For example, as described herein, the virus 108 may have a signature, e.g., associated with a header, packet, or payload of the virus 108. The immunization system 110

(e.g., the network monitor 120) may then, for example, compare the signature of the virus 108 to the set of known and/or authorized signatures for the communications network 102, as may be stored in the virus data 124. Of course, the network monitor 120 also may compare the signature of the virus 108 against a set of known virus signatures in the virus data 124. At the operation 604, the virus may be determined based on the comparison. For example, where the detection rules 122 are used to compare the signature of the virus 108 against a set of known authorized signatures, the network monitor 120 may determine that the signature does not match any of the known authorized signatures, and thus may determine that the signature is associated with a virus, e.g., the virus 108. Where the detection rules 122 are used to compare the signature of the virus 108 against a set of known virus signatures, the network monitor 120 may determine that the signature does (or does not) match a known virus signature(s), and thus may determine that the signature is that of the virus 108.

At the operation 606, a notification of the virus from a virus detection program may be received. For example, a virus detection program may include at least a portion of the network monitor 120, which may be running on (or in association with) the communications network 102 (e.g., the infected network device 116). Then, the immunization system 110 (e.g., a secondary/remote portion of the network monitor 120, along with the detection rules 122, and/or the virus data 124) may receive a notification of the virus from the virus detection program. At the operation 608, the virus may be determined, based on the notification. For example, the secondary/remote portion of the network monitor 120 may receive the notification from the virus detection program running on the infected network device 116, and may then determine the virus 108 by, for example, implementing the detection rules 122.

At the operation 610, a fault pattern associated with the virus and/or the communications network may be determined. For example, after the virus 108 infects the (one or more) infected network device(s) 116 and/or the communications network 102, the virus 108 may cause a fault pattern to occur that is detectable by the network monitor 120. For example, the network monitor 120 may determine a fault pattern, including, for example, some combination of reduced speed and/or available bandwidth of the communications network 102, reduced memory or speed of the (infected) network device 116, or a suspicious number of unrecognized executable files on the (infected) network device 116. Such fault patterns, as a whole, may be sufficient to indicate or identify the virus 108, where any one aspect of the fault pattern may not be sufficient. At the operation 612, the virus is determined based on the fault pattern. For example, after the network monitor 120 determines the fault pattern of the infected network device 116 and/or the communications network 102, the network monitor 120 may then apply the detection rules 122 to determine that the detected fault pattern is associated with the virus 108.

At the operation 614, a comparison of an expected characteristic of the communications network may be performed with an actual characteristic of the communications network. For example, the communications network 102 may be expected to deliver an e-mail message from a first computer to a second computer on the communications network 102, within a known amount of time. Then, for example, the communications network 102 may actually deliver the e-mail message from the first computer to the second computer in some significantly longer timeframe. The network monitor 120 of the immunization system 110 may then, for example, compare the expected time with the actual time. At the operation 616, the virus may be determined based on the comparison. For example, the network monitor 120 may implement the detection rules 122 to determine that the virus 108 is known to cause similar delays in e-mail delivery.

At the operation 618, the virus may be determined, the virus including code that is self-propagating within the communications network. For example, the virus 108 may include a self-propagating code infecting the infected network device 116 of the communications network 102, so that, for example, the virus 108 may be configured to propagate from the infected network device 116, to another network device on the communications network 102 (e.g. the non-infected network device 118), without action or assistance of/by the user 142. In an additional or alternative example, the virus 108 may be loaded onto the infected network device 116 of the communications network 102, and may be configured to read the e-mail address book of the infected network device 116 and send itself to all of the included addresses on the communications network 102, thus propagating itself throughout the communications network 102. Other examples of self-propagation may be understood to exist in other contexts or implementations of the communications network 102, as would be apparent. For example, the communications network 102 may represent a plurality of Bluetooth networks implemented on a plurality of cell phones and/or personal digital assistants (PDAs), and the virus 108 may propagate by communicating with unsecured Bluetooth connections that may be available on the plurality of Bluetooth networks, as the user 142 moves from one a location of one of the Bluetooth networks to a location of another of the Bluetooth networks.

Figure 7:
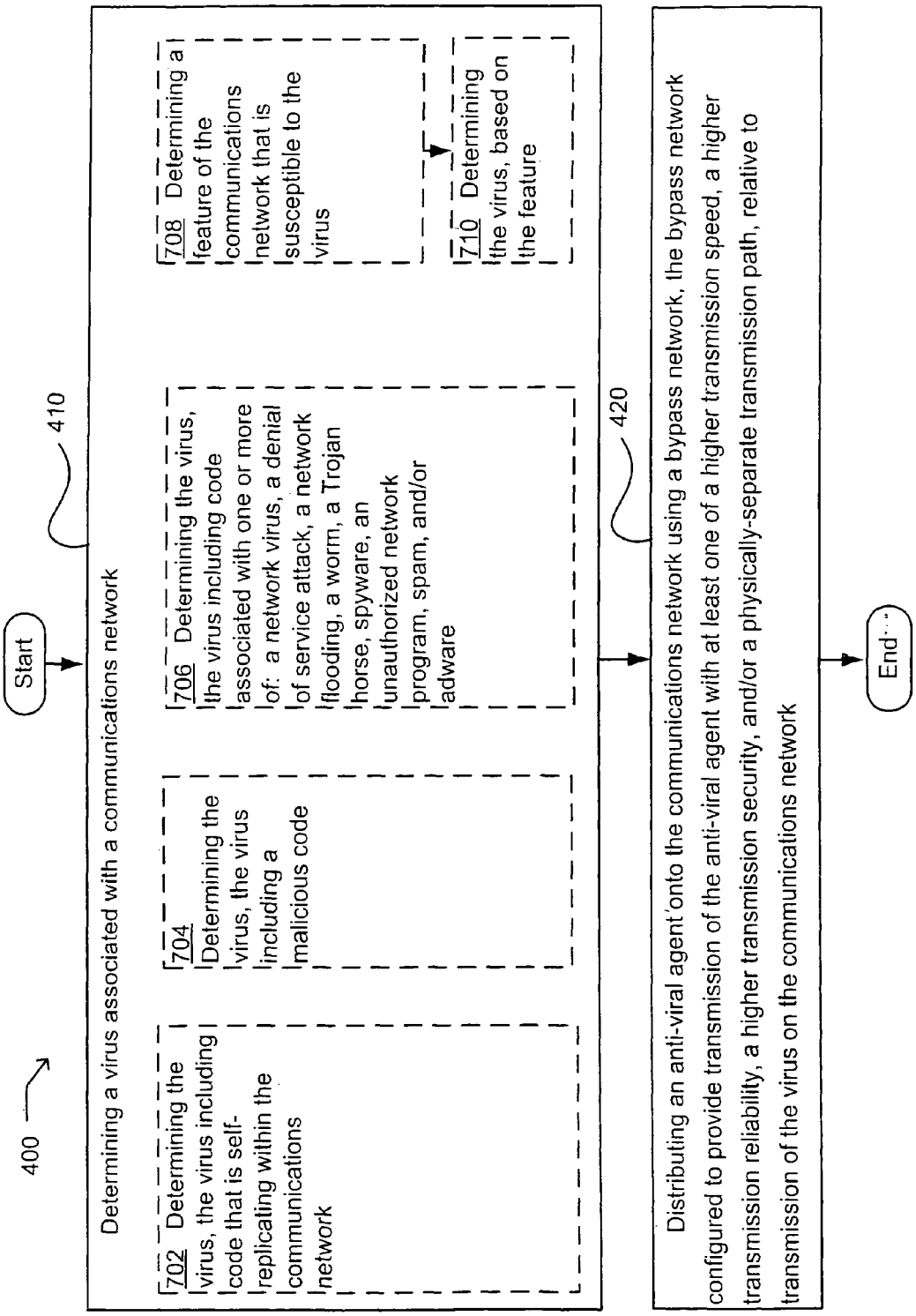
FIG. 7 illustrates an alternative embodiment of the example operational flow of FIG. 4.

FIG. 7 illustrates alternative embodiments of the example operational flow 400 of FIG. 4. FIG. 7 illustrates example embodiments where the determining operation 410 may include at least one additional operation. Additional operations may include an operation 702, an operation 704, an operation 706, an operation 708, and/or an operation 710.

At the operation 702, the virus may be determined, the virus including code that may be self-replicating within the communications network. For example, the virus 108 may include self-replicating code on the infected network device 116. The virus 108 may then, for example, replicate itself throughout a plurality of programs and/or files on the infected network device 116. Then, if the infected network device 116 transmits a file over the communications network 102, e.g., to the non-infected network device 118, the self-replicating code may have infected the transmitted file, and may thus be attached to the file. The immunization system 110, then may, for example, determine the self-replicating code (e.g., the virus 108) on the infected network device 116 and/or on the file itself, so as to identify or otherwise determine the virus 108.

At the operation 704, the virus may be determined, the virus including a malicious code. For example, the virus 108 may be designed, for example, to erase some or all files on the infected computer 116, or may otherwise cause harm or inconvenience to the infected network device 116, the communications network 102, and/or the user 142.

At the operation 706, the virus may be determined, the virus including code associated with one or more of: a network virus, a denial of service attack, a network flooding, a worm, a Trojan horse, spyware, an unauthorized network program, and/or adware. For example, the virus 108 may be associated with a network flooding, wherein the virus 108 may operate on the infected network device(s) 116 to transmit a stream of large files from the infected network device 116 onto the communications network 102, thus flooding the communications network 102 and making it more difficult for other network devices to transmit data across the communications network 102, in another example, the virus 108 may be associated with an adware program, wherein the virus 108 may operate on the infected network device 116 to cause the infected network device 116 to display a plurality of ads for products, which may not be requested or desired by the user 142.

At the operation 708, a feature of the communications network that is susceptible to the virus may be determined. For example, the virus 108 may be known to infect communications networks running a particular version of a particular operating system, or communicating with a particular network protocol. Thus, for example, the network monitor 120 may determine such a feature(s), and may determine the susceptibility of the communications network 102 that is caused by such a feature(s). At the operation 710, the virus may be determined, based on the feature. For example, the network monitor 120 may apply the detection rules 122 to determine that the feature(s) (e.g., operating system or network protocol) are associated with, e.g., susceptible to, the virus 108.

Figure 8:
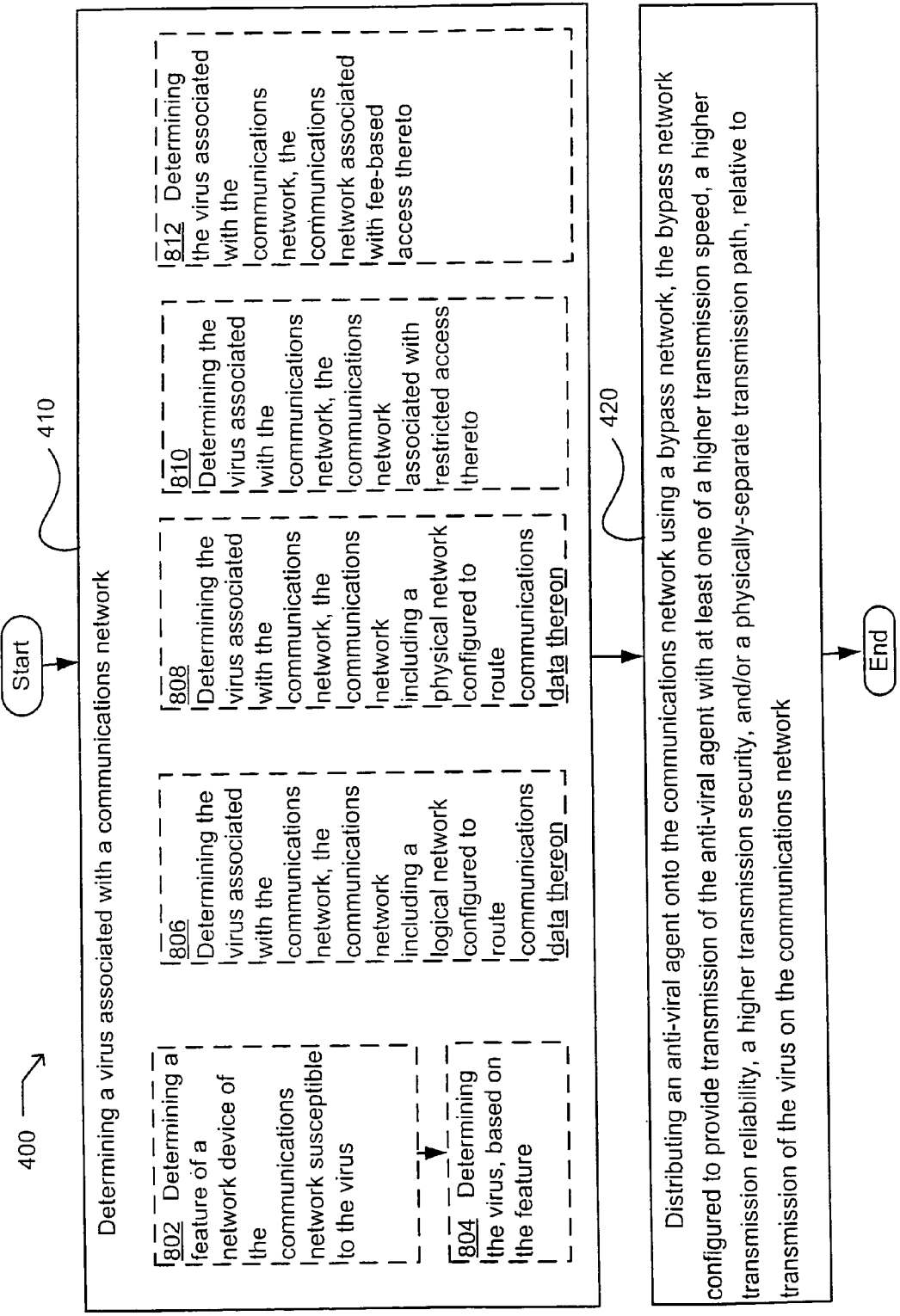
FIG. 8 illustrates an alternative embodiment of the example operational flow of FIG. 4.

FIG. 8 illustrates alternative embodiments of the example operational flow 400 of FIG. 4. FIG. 8 illustrates example embodiments where the determining operation 410 may include at least one additional operation. Additional operations may include an operation 802, an operation 804, an operation 806, an operation 808, an operation 810 and/or an operation 812.

At the operation 802, a feature of a network device of the communications network susceptible to the virus is determined. For example, the virus 108 may be known to infect a particular type or model of network device(s), such as, for example, a particular type of cell phone or personal digital assistant. At the operation 804, the virus may be determined, based on the feature. For example, the immunization system 110 may determine the virus 108, based on the type or model of the (infected) network device 116 and/or based on the non-infected network device 118. It should be understood that such determination of the virus 108 may occur, as in many other examples described herein, either before, during, or after an infection of the communications network 102 (or particular network device thereof) by the virus 108.

At the operation 806, the virus associated with the communications network may be determined, the communications network including a logical network configured to route communications data thereon. For example, the communications network 102 may include a logical network defined on top of an underlying physical network, and the communications network 102 may be configured to route communications data, such as, for example, authorized e-mail traffic or other desired information or files provided to or by (and/or authorized by) one or more of the user(s) 142.

At the operation 808, the virus associated with the communications network may be determined, the communications network including a physical network configured to route communications data thereon. For example, the communications network 102 may include a physical network, and the communications network 102 may be configured to route communications data, that, as just described, may include virtually any authorized/desired information provided to or by and/or authorized by one or more of the user(s) 142.

At the operation 810, the virus associated with the communications network may be determined, the communications network associated with restricted access thereto. For example, the communications network 102 may be a corporate intranet, wherein only users (e.g., the user 142) having an appropriate login and/or password may have access thereto. In these and similar examples, the entity 140 may be responsible for providing the authorized access to the communications network 102. In other examples, the user 142 may represent a customer of the entity 140, and may take more direct responsibility for restricting access to the communications network.

At the operation 812, the virus associated with the communications network may be determined, the communications network associated with fee-based access thereto. For example, the communications network 102 may provide network services to the user(s) 142, who may pay a monthly fee for such network services. As in the examples just referenced, the entity 140 may be responsible for collecting the fee(s) and/or restricting the access of users who do not pay the fees.

Figure 9:
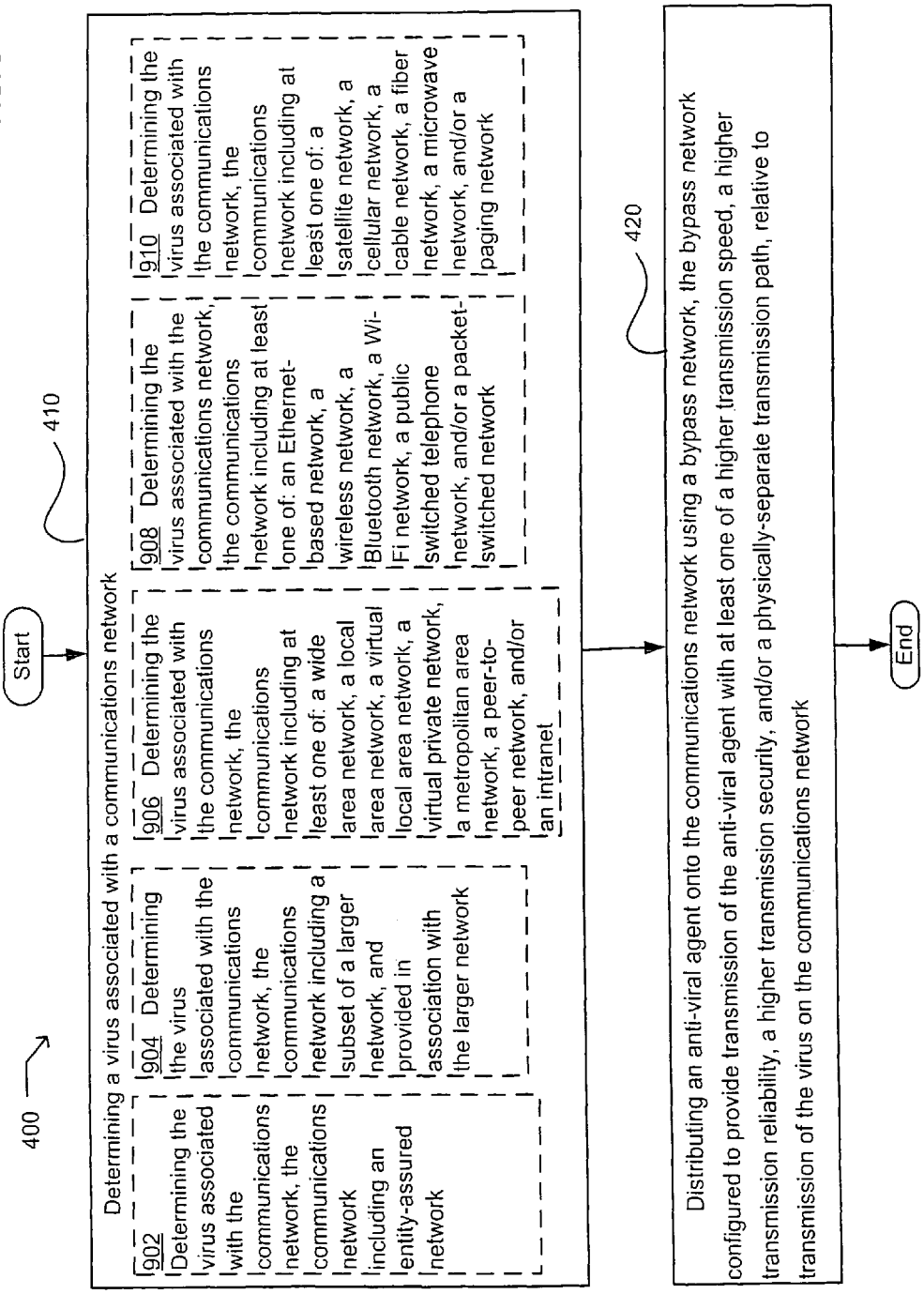
FIG. 9 illustrates an alternative embodiment of the example operational flow of FIG. 4.

FIG. 9 illustrates alternative embodiments of the example operational flow 400 of FIG. 4. FIG. 9 illustrates example embodiments where the determining operation 410 may include at least one additional operation. Additional operations may include an operation 902, an operation 904, an operation 906, an operation 908, and/or an operation 910.

At the operation 902, the virus associated with the communications network may be determined, the communications network including an entity-assured network. For example, the entity 140 may assure the user 142 of the communications network 102 that viruses, such as the virus 108, will be limited from propagation on the communications network 102. The user 142 may thus be provided with greater reliance on, and enjoyment of, the communications network 102. Moreover, the user 142 need not, in at least some implementations, be required to run and/or update anti-virus software at each (or any particular) network device of the communications network 102.

At the operation 904, the virus associated with the communications network may be determined, the communications network including a subset of a larger network, and provided in association with the larger network. For example, the communications network 102 may include, as shown in FIG. 2 and described herein, the commodity network 204 (e.g., a VPN) as a subset of the public Internet 202.

At the operation 906, the virus associated with the communications network may be determined, the communications network including at least one of: a wide area network, a local area network, a virtual local area network, a virtual private network, a metropolitan area network, a peer-to-peer network, and/or an intranet. Such examples of the communications network 102, and other examples, may be understood from FIG. 2 and the associated description provided herein, e.g., with reference to the networks 202-212. For example, a corporation, as the user 142, may pay the entity 140 to provide a plurality of local area networks (and/or virtual local area networks) that are interconnected by a wide area network, with associated uplinks and connections that allow the corporation, which may be widely dispersed geographically, to nonetheless maintain the communications network 102 as a secure, private, convenient, and cost-effective resource for the corporation's employees and/or venders.

At the operation 908, the virus associated with the communications network may be determined, the communications network including at least one of: an Ethernet-based network, a wireless network, a Bluetooth network, a Wi-Fi network, a public switched telephone network, and/or a packet-switched network. For example, as referenced herein, the communications network 102 may include a corporate intranet that is provided as a wireless network across a campus(es) of the corporation.

At the operation 910, the virus associated with the communications network may be determined, the communications network including at least one of: a satellite network, a cellular network, a cable network, a fiber network, a microwave network, and/or a paging network. As above, such examples of the communications network 102, and other examples, may be understood from FIG. 2 and the associated description provided herein, e.g., with reference to the networks 202-212. For example, FIG. 2 illustrates the satellite network 210 and/or the satellite radio network 212, where the former example may be used, for example, by an international corporation or conglomerate (e.g., the user 142) to provide a high-speed, secure, world-wide corporate network.

Figure 10:
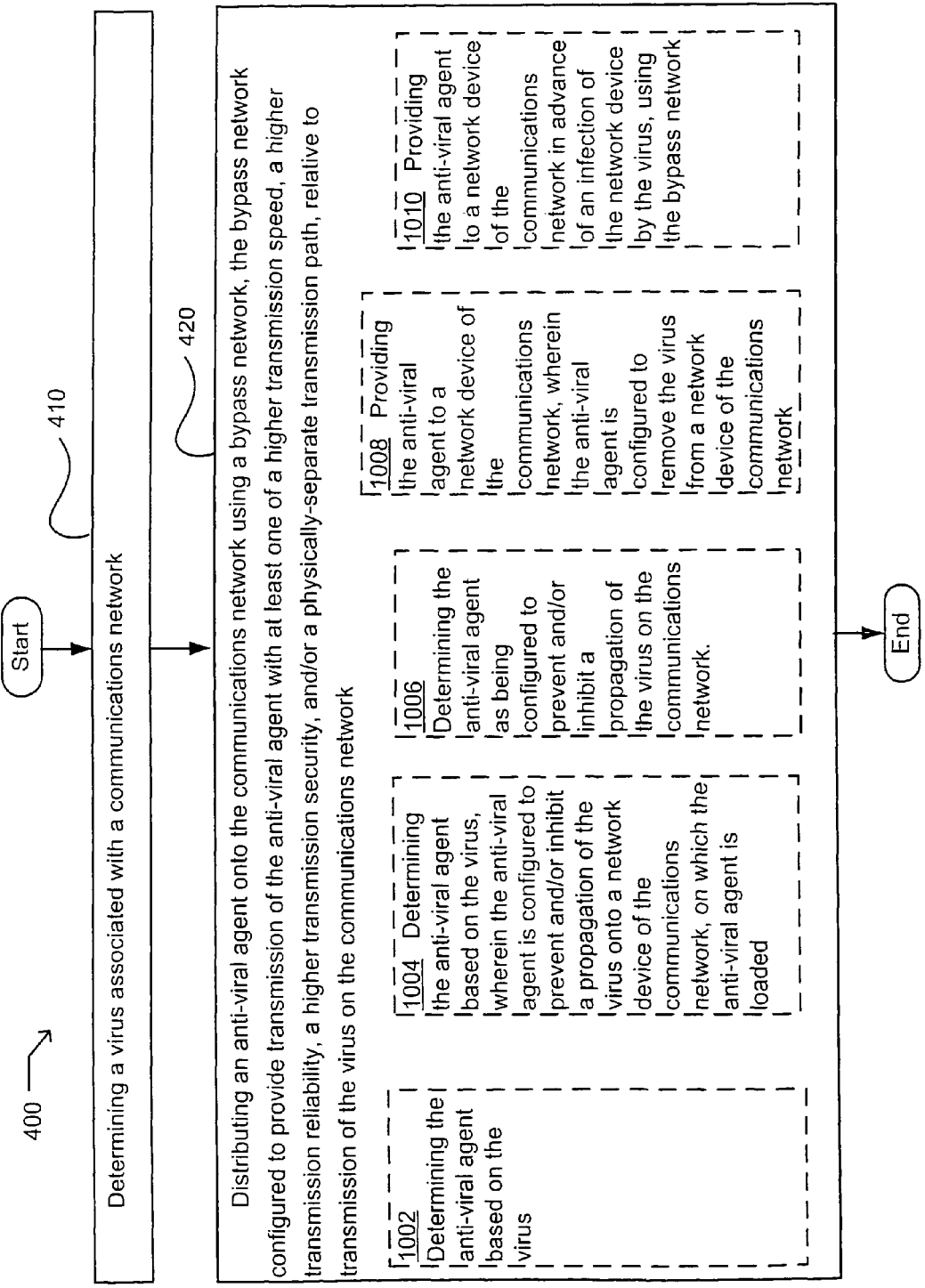
FIG. 10 illustrates an alternative embodiment of the example operational flow of FIG. 4.

FIG. 10 illustrates alternative embodiments of the example operational flow 400 of FIG. 4. FIG. 10 illustrates example embodiments where the distributing operation 420 may include at least one additional operation. Additional operations may include an operation 1002, an operation 1004, an operation 1006, an operation 1008, and/or an operation 1010.

At the operation 1002, the anti-viral agent is determined, based on the virus. For example, the network monitor 120 of the immunization system 110 may implement the detection rules 122 to detect the virus 108 on the infected network device 116. Then, for example, the response generator 126 of the immunization system 110 may determine the anti-viral agent 112 (and/or the anti-viral agent 114) in response to the virus 108, e.g., by using the response rules 128 in association with the anti-viral agent data 130.

At the operation 1004, the anti-viral agent may be determined, based on the virus, wherein the anti-viral agent is configured to prevent and/or inhibit a propagation of the virus onto a network device of the communications network, on which the anti-viral agent is loaded. For example, the response generator 126 may create, generate, obtain, identify, or otherwise determine the anti-viral agent 112, in response to certain properties of the virus 108 (e.g., provided by the network monitor 120). Then, as described in more detail herein, the response generator 126 ma) distribute the anti-viral agent 112 onto the communications network 102, e.g., onto the non-infected device 118, using the logical bypass network 104. Once present on the non-infected device 118, the anti-viral agent 112 may, for example, immunize the non-infected device 118 against the virus 108. Therefore, in this example, by the time the virus 108 travels from the infected device 116 to the non-infected device 118, the multi-network virus immunization system 100 has protected the non-infected device 118 therefrom.

At the operation 1006 the anti-viral agent may be determined as being configured to prevent and/or inhibit a propagation of the virus on the communications network. That is, in this example, it may not be the case (as in the operation 1004) that the anti-viral agent 112 is loaded onto a network device (e.g., the non-infected network device 118) of the communications network 102. Rather, for example, it may be the case that the immunization system 110 determines the anti-viral agent 112 as one that simply shuts down communications with the infected network device 116, or otherwise prevents or limits propagation of the virus 108 on the communications network 102.

At the operation 1008, the anti-viral agent may be provided to a network device of the communications network, wherein the anti-viral agent may be configured to remove the virus from a network device of the communications network. For example, immunization system 110 may determine that the virus 108 may have infected a program on the infected network device 116. Then, the immunization system 110 may, for example, provide the anti-viral agent 112 to the infected network device 116, and the anti-viral agent 112 may be configured to remove the program (and thus the virus 108) from the infected network device 116 of the communications network 102.

At the operation 1010, the anti-viral agent may be provided to a network device of the communications network in advance of an infection of the network device by the virus, using the bypass network. For example, the immunization system 110 may provide the anti-viral agent 112 to the non-infected network device 118, before the virus 108 reaches the non-infected network device 118, using, e.g., the logical bypass network 104, where, as described herein, the logical bypass network 104 may be configured to deliver the anti-viral agent 112 to the non-infected network device 118 with a greater transmission speed than may be generally available to the virus 108 on the communications network 102.

Figure 11:
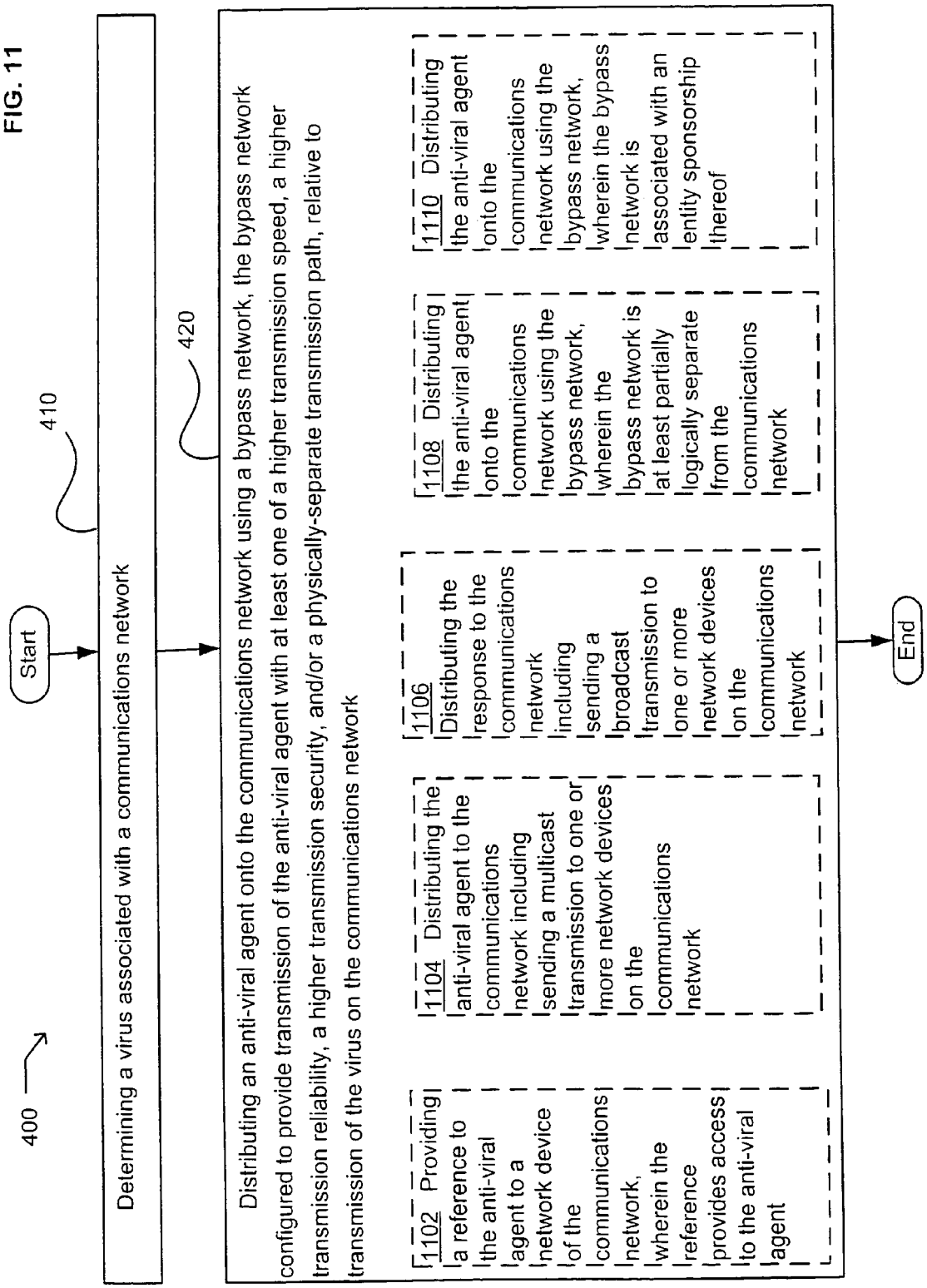
FIG. 11 illustrates an alternative embodiment of the example operational flow of FIG. 4.

FIG. 11 illustrates alternative embodiments of the example operational flow 400 of FIG. 4. FIG. 11 illustrates example embodiments where the distributing operation 420 may include at least one additional operation. Additional operations may include an operation 1102, an operation 1104, an operation 1106, an operation 1108, and/or an operation 1110.

At the operation 1102, a reference to the anti-viral agent may be provided to a network device of the communications network, wherein the reference provides access to the anti-viral agent. For example, the immunization system 110 may, in response to the virus 108, provide the reference 132 to the communications network 102 rather than the anti-viral agent 112 itself. The reference 132 may include, for example, a key or other access code that allows the non-infected network device 118 of the communications network 102 to access the anti-viral agent 112, that may be stored, for example, in the anti-viral agent data 130. In an alternative example, the reference may be an internet or intranet address that points the non-infected network device 118 of the communications network 102 to the anti-viral agent data 130 (which may be stored offline and/or include a library of anti-viral agent(s)), and that thereby allows access to the anti-viral agent 112. The reference also may include instructions or data, such as, for example, a signature file, that may be used with a pre-existing anti-viral technique/solution/agent to combine to create the anti-viral agent 112.

At the operation 1104, the anti-viral agent may be distributed to the communications network including sending a multicast transmission to one or more network devices of the communications network. For example, the response generator 126 may determine that the anti-viral agent 112 should be distributed to certain ones of the network devices on the communications network 102 (e.g., the network devices having the highest degree of connectivity to other network devices), and may determine that a multi-cast transmission thereto may provide an effective distribution technique for reaching the certain network devices as quickly as possible in a given circumstance.

At the operation 1106, the anti-viral agent may be distributed to the communications network including sending a broadcast transmission to one or more network devices of the communications network. For example, and in contrast to the example just given, the immunization system 110 (e.g., the response generator 126) may determine that a broadcast message to all available devices of the communications network 102 may be the fastest and most effective distribution technique. This may be the case, for example, in the context of a relatively smaller network, and/or where time is most limited to stop or limit the spread of the virus 108

At the operation 1108, the anti-viral agent may be distributed onto the communications network using the bypass network, wherein the bypass network is at least partially logically separate from the communications network. For example, it may be the case that segments or portions of the logical bypass network 104 are logically separate from the communications network 102, while other segments or portions may be completely logically separate. Of course, in other implementations, the logical bypass network 104 may be completely logically separate from the communications network 102, as well.

At the operation 1110 the anti-viral agent is distributed onto the communications network using the bypass network, wherein the bypass network is associated with an entity-sponsorship thereof. For example, as described herein, the entity 140 may assure, guarantee, provide, or otherwise sponsor the logical bypass network 104 and/or the physical bypass network 106, so that the user 142 may have a greater reliance on, and enjoyment of, the communications network 102. For example, the entity 140 may sponsor the logical bypass network 104 and/or the physical bypass network 106 and may assure one or more of the higher transmission speed, the higher transmission reliability, the higher transmission security, and/or the physically-separate transmission path.

Figure 12:
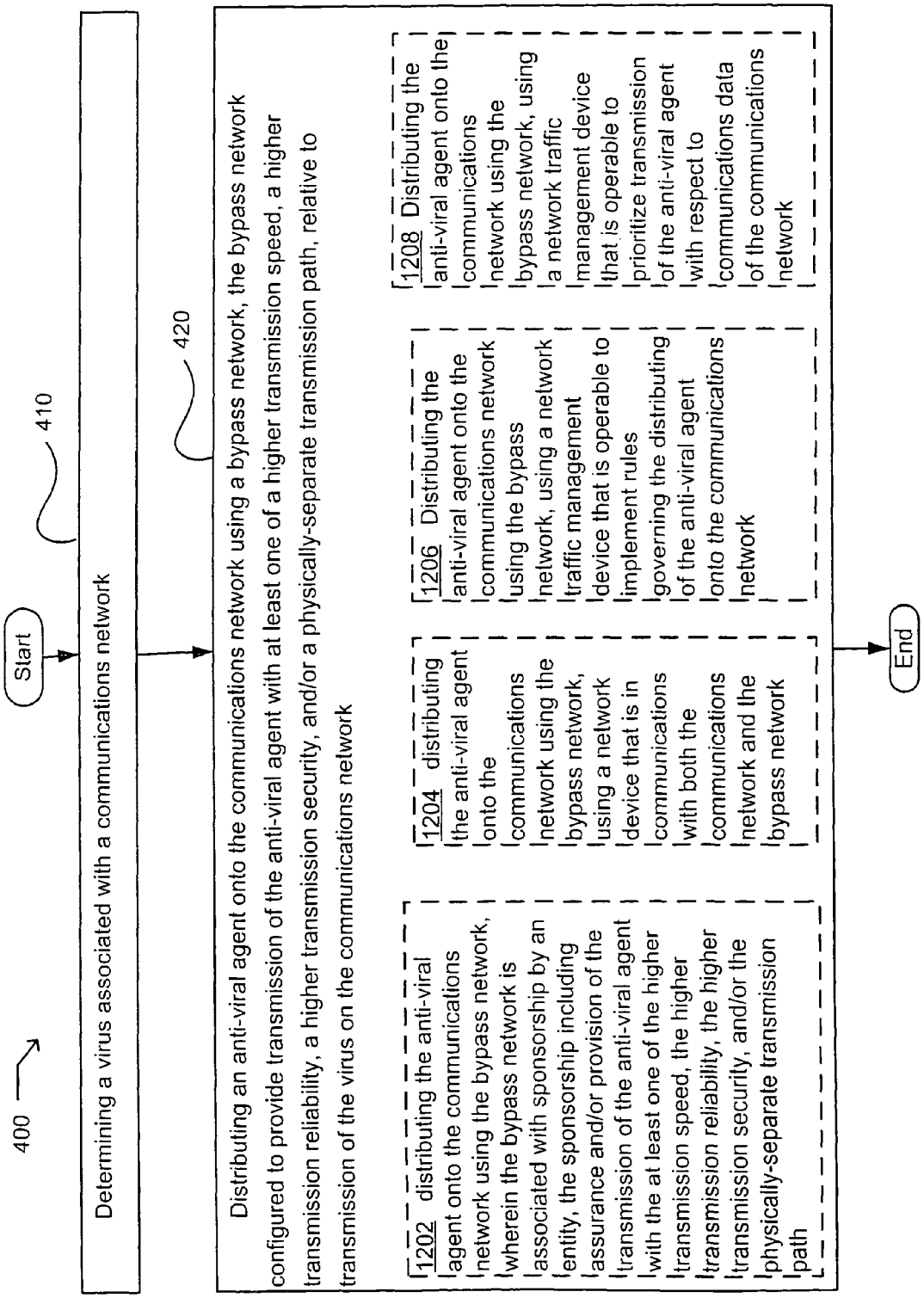
FIG. 12 illustrates an alternative embodiment of the example operational flow of FIG. 4.

FIG. 12 illustrates alternative embodiments of the example operational flow 400 of FIG. 4. FIG. 12 illustrates example embodiments where the distributing operation 420 may include at least one additional operation. Additional operations may include an operation 1202, an operation 1204, an operation 1206, and/or an operation 1208.

At the operation 1202 the anti-viral agent may be distributed onto the communications network using the bypass network, wherein the bypass network is associated with sponsorship by an entity, the sponsorship including assurance and/or provision of the transmission of the anti-viral agent with the at least one of the higher transmission speed, the higher transmission reliability, the higher transmission security, and/or the physically-separate transmission path. For example, as just described, the entity 140 may provide the logical bypass network 104 and/or the physical bypass network 106 having one or more of the characteristics of the higher transmission speed, the higher transmission reliability, the higher transmission security, and/or the physically-separate transmission path.

At the operation 1204, the anti-viral agent may be distributed onto the communications network using the bypass network, using a network device that is in communications with both the communications network and the bypass network. For example, the immunization system 110 may provide the anti-viral agent 112 to the communications network 102 using the network traffic manager 136 and the logical bypass network 104, or may provide the anti-viral agent 114 to the communications network 102 using the network traffic manager 138 and the physical bypass network 106.

At the operation 1206 the anti-viral agent may be distributed onto the communications network using the bypass network, using a network traffic management device that is operable to implement rules governing the distributing of the anti-viral agent onto the communications network. For example, and similarly to the example just given, the immunization system 110 may provide the anti-viral agent 112 to the communications network 102 using the network traffic manager 136 and the logical bypass network 104, or may provide the anti-viral agent 114 to the communications network 102 using the network traffic manager 138 and the physical bypass network 106. In either or both cases, the network traffic managers 136, 138 may be operable to implement at least a portion of the immunization system 110, including implementation of the response rules 128, which, as described herein, may be used to govern whether, when, and/or how the anti-viral agents 112, 114 may be distributed onto the communications network 102. Then, for example, the network traffic manager 136 may implement the response rules 128 to prohibit, delay, or impede the transmission of some or all communications data on the communications network 102, until the anti-viral agent 112 (or the anti-viral agent 114) has been transmitted.

At the operation 1208, the anti-viral agent may be distributed onto the communications network using the bypass network, using a network traffic management device that is operable to prioritize transmission of the anti-viral agent with respect to communications data of the communications network. For example, as referenced herein, the network traffic manager 136 may include a router that is operable to implement tag-prioritized routing, in which the top "n" tags are reserved for transmitting the anti-viral agent 112.

Figure 13:
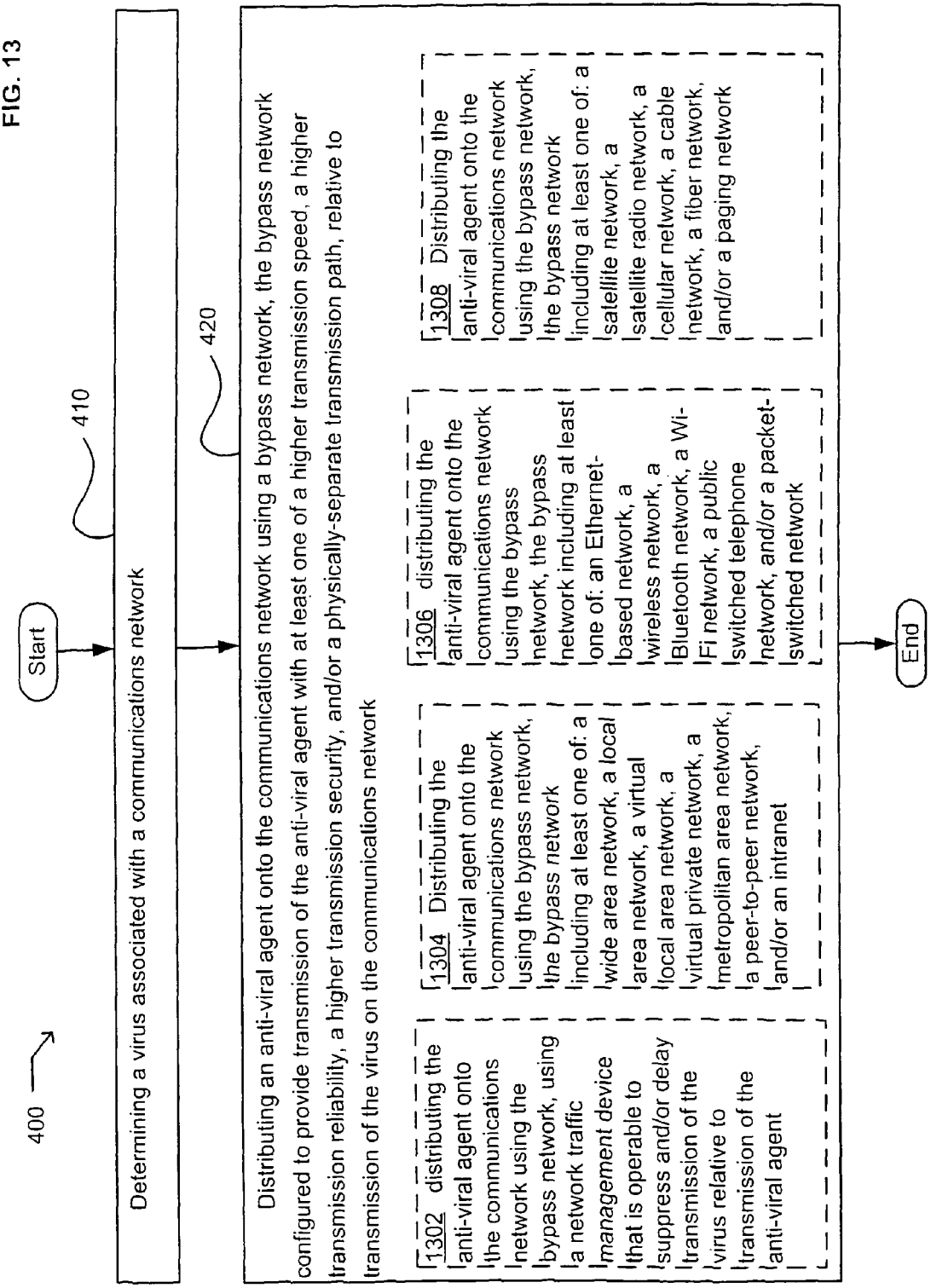
FIG. 13 illustrates an alternative embodiment of the example operational flow of FIG. 4.

FIG. 13 illustrates alternative embodiments of the example operational flow 400 of FIG. 4. FIG. 13 illustrates example embodiments where the distributing operation 420 may include at least one additional operation. Additional operations may include an operation 1302, an operation 1304, an operation 1306, and/or an operation 1308.

At the operation 1302, the anti-viral agent may be distributed onto the communications network using the bypass network, using a network traffic management device that is operable to suppress and/or delay transmission of the virus relative to transmission of the anti-viral agent. For example, the network traffic manager 136 may implement some or all of the immunization system 110, and may thus be able to detect or otherwise recognize the virus 108 (e.g., by detecting a virus signature thereof). Then, the response rules 128 may dictate that any potential virus, such as the virus 108, should be buffered within the network traffic manager 136. In this way, the immunization system 110 may be better able to provide the anti-viral agent 112 to the communications network 102 (e.g., to the non-infected network device 118) in advance of the virus 108.

At the operation 1304, the anti-viral agent may be distributed onto the communications network using the bypass network, the bypass network including at least one of: a wide area network, a local area network, a virtual local area network, a virtual private network, a metropolitan area network, a peer-to-peer network, and/or an intranet. For example, as should be apparent from FIG. 3, e.g., from the networks 104, 106, and/or 304-324 (and, by analogy, to the networks 202-212 of FIG. 2), the bypass network 302 may include any number of such examples of network types or configurations, as well as many other examples, not specifically mentioned. For example, the communications network 102 may include a first peer-to-peer network (e.g., the peer-to-peer network 208), while the bypass network 302 may include a second peer-to-peer network (e.g., the peer-to-peer network(s) 318, 320). In this example, the peer-to-peer networks 208 and 318/320 may be provided in conjunction with one another, and may be associated/reserved, respectively, for communications data and the anti-viral agent(s) 112, 114.

At the operation 1306, the anti-viral agent may, be distributed onto the communications network using the bypass network, the bypass network including at least one of: an Ethernet-based network, a wireless network, a Bluetooth network, a Wi-Fi network, a public switched telephone network, and/or a packet-switched network. For example, the bypass network 302 may include the cellular network 316 that is implemented as a wireless network, and that provides one or more of the herein-described advantages for transmission of the anti-viral agent(s) 112, 114 to the communications network 102.

At the operation 1308 the anti-viral agent is distributed onto the communications network using the bypass network, the bypass network including at least one of: a satellite network, a satellite radio network, a cellular network, a cable network, a fiber network, and/or a paging network. For example, as shown in FIG. 3, the bypass network 302 may include the satellite radio network 212. In this case, the communications network 102 may include, as referenced herein, a plurality of Bluetooth networks, so that the virus 108 may spread onto a mobile phone or PDA as the infected network device 116. Then, a satellite radio transceiver in a vehicle of the user 142 may implement some or all of the immunization system 110, so that the user 142 may have his or her (Bluetooth) mobile phone immunized against the virus 108 by way of the satellite radio transceiver. In such examples, the entity 140 providing the bypass network 302 (e.g., the satellite radio network 212) may include, for example, the operator of the satellite radio network 212, or may include a third party associated with, or operating in partnership with, the satellite radio network operator/provider.

Figure 14:
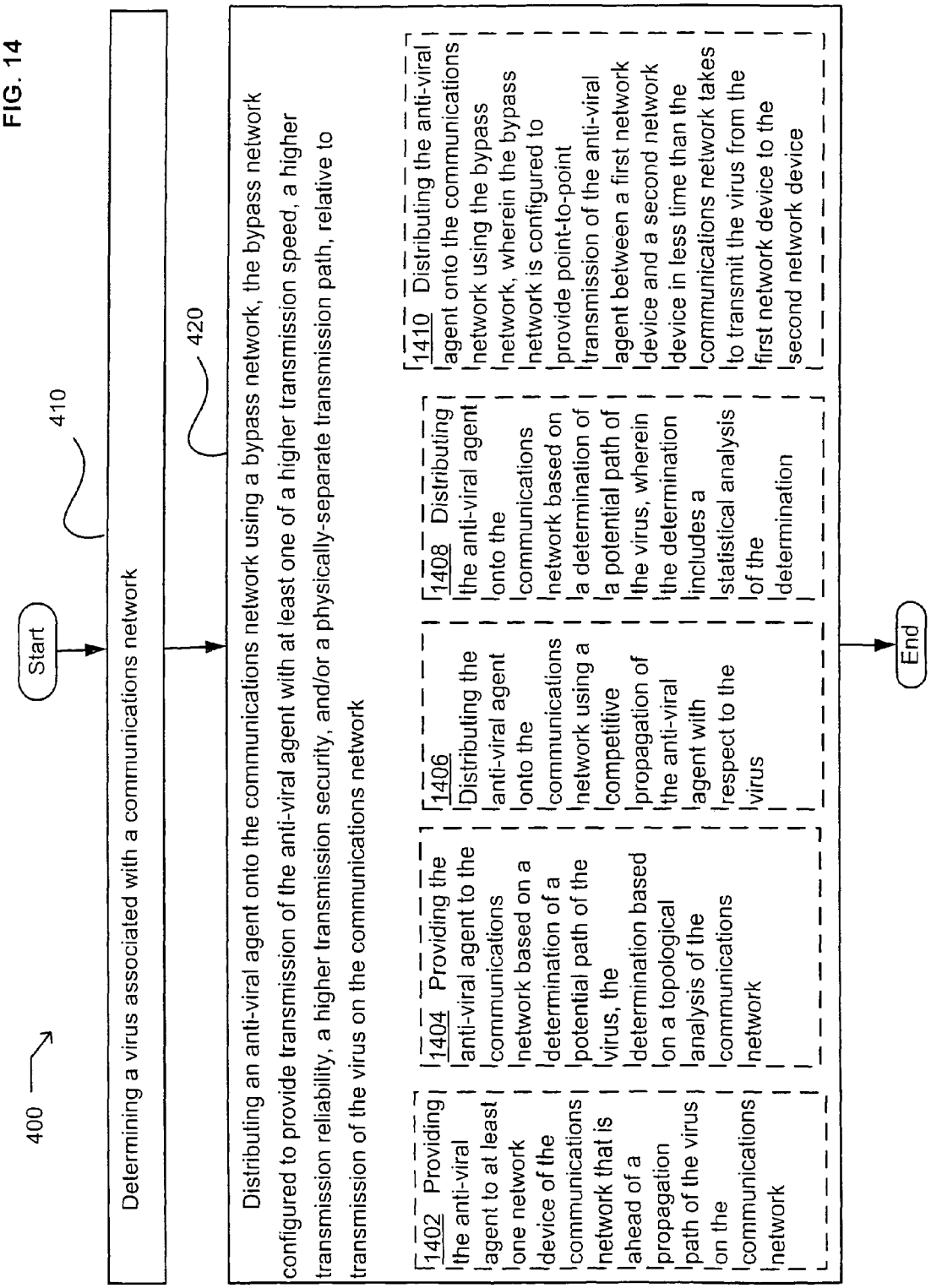
FIG. 14 illustrates an alternative embodiment of the example operational flow of FIG. 4.

FIG. 14 illustrates alternative embodiments of the example operational flow 400 of FIG. 4. FIG. 14 illustrates example embodiments where the distributing operation 420 may include at least one additional operation. Additional operations may include an operation 1402, an operation 1404, an operation 1406, an operation 1408, and/or an operation 1410.

At the operation 1402, the anti-viral agent may be provided to at least one network device of the communications network that is ahead of a propagation path of the virus on the communications network. For example, as described herein, the immunization system 110 may provide the anti-viral agent 112 to the non-infected network device 118 ahead of, e.g., before, propagation of the virus 108 to the non-infected network device 118 from the infected network device 116.

At the operation 1404, the anti-viral agent may be provided to the communications network based on a determination of a potential path of the virus, the determination based on a topological analysis of the communications network. For example, the communications network 102 may include a network having a mesh, star, tree/hierarchical, bus, or ring topology, to name a few, and different such topologies may lend themselves to different distribution techniques (where a determination between distribution techniques may be made, for example, by the response generator 126, using the response rules 128). For example, in a hierarchical topology (such as may be used, for example, by a financial institution or other hierarchically-arranged corporate structure), the anti-viral agent 112 may be distributed to a certain strategic point on the tree/hierarchy, so that network devices that are below the strategic point are protected from the virus 108, and the strategic point serves as a firebreak for the spread of the virus 108. For example, the non-infected network device 118 may represent a point on a network hierarchy having a relatively large number of lower-level devices connected thereto. In another example, and as described herein, the communications network 102 may include a mesh network, and the immunization system 110 may select the non-infected network device 118 as having a high degree of connectivity to other network devices of the communications network 102.

At the operation 1406, the anti-viral agent may be distributed onto the communications network using a competitive propagation of the anti-viral agent with respect to the virus. For example, the immunization system 110 may determine the anti-viral agent 112 as one that competes with the virus 108 for resources of the communications network 102 (or network devices thereof), so that the anti-viral agent 112 ensures virus 108 is "starved" from propagating in a designed manner. For example, the anti-viral agent may occupy a particular application or feature of the non-infected network device 118 that is required by the virus 108 for continued propagation/replication.

At the operation 1408, the anti-viral agent may be distributed onto the communications network based on a determination of a potential path of the virus 108, wherein the determination includes a statistical analysis of the determination. For example, the immunization system 110 may analyze a current, known distribution of the virus 108, and may combine this knowledge with general knowledge of the communications network 102 (e.g., knowledge of which network device possesses a high degree of connectivity) to predict a likely path of the virus 108. Then, for example, the immunization system 110 may select the network devices with the highest likelihood of receiving the virus 108, and may prioritize these network devices for distribution of the anti-viral agent 112 thereto.

At the operation 1410 the anti-viral agent may be distributed onto the communications network using the bypass network, wherein the bypass network may be configured to provide point-to-point transmission of the anti-viral agent between a first network device and a second network device in less time than the communications network takes to transmit the virus from the first network device to the second network device. For example, as described herein, the logical bypass network 104 may include some or all of the same physical devices of the communications network 102, but may be logically connected in different ways. Thus, the communications network 102 may transmit the virus 108 from a first network device to a second network device in a certain number of seconds, while the logical bypass network 104 may transmit the anti-viral agent 112 from the first network device to the second network device in some lesser amount of time.

Figure 15:
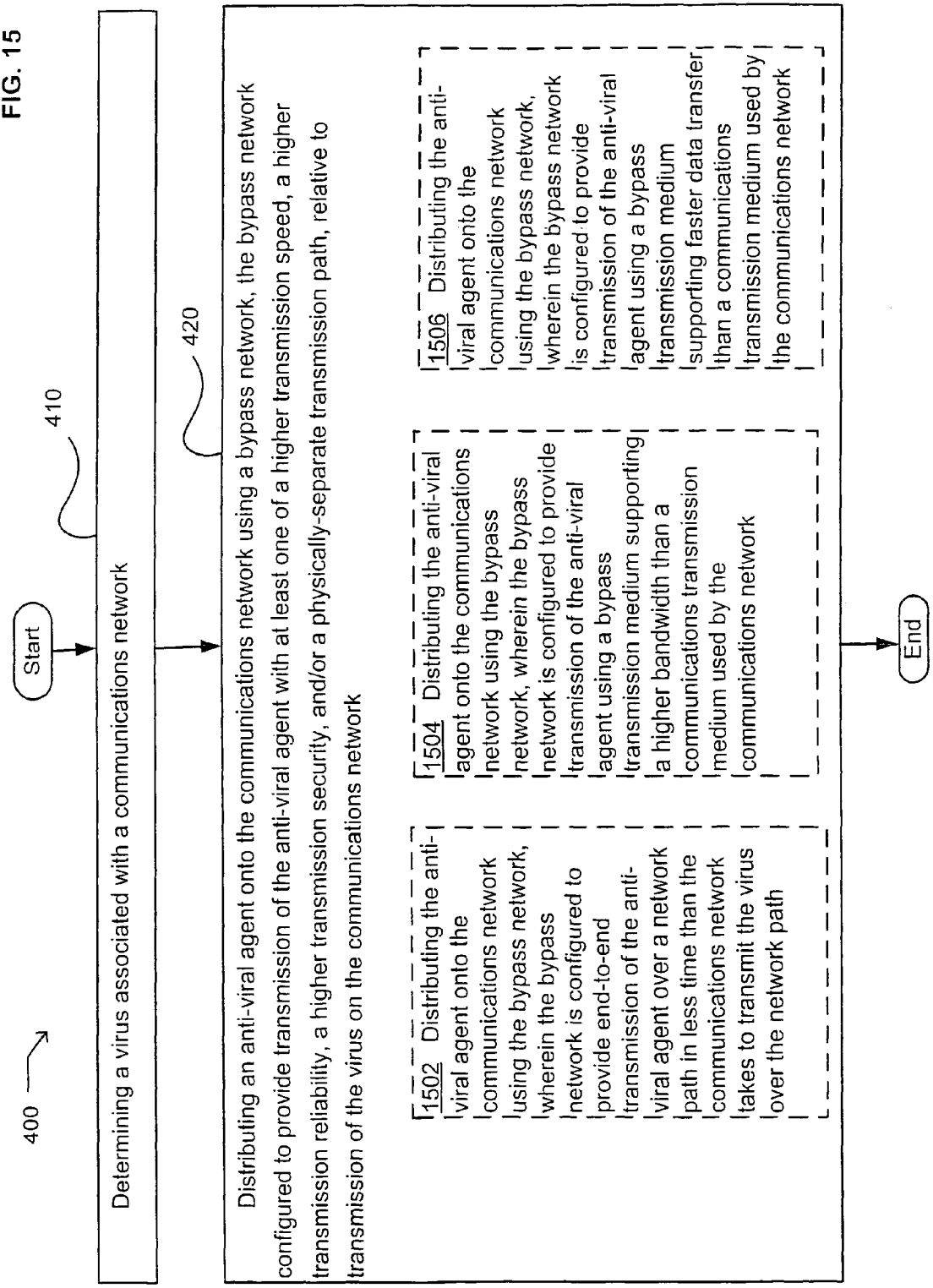
FIG. 15 illustrates an alternative embodiment of the example operational flow of FIG. 4.

FIG. 15 illustrates alternative embodiments of the example operational flow 400 of FIG. 4. FIG. 15 illustrates example embodiments where the distributing operation 420 may include at least one additional operation. Additional operations may include an operation 1502, an operation 1504, and/or an operation 1506.

At the operation 1502 the anti-viral agent may be distributed onto the communications network using the bypass network, wherein the bypass network may be configured to provide end-to-end transmission of the anti-viral agent over a network path in less time than the communications network takes to transmit the virus over the network path. For example, there may be a network path between the infected network device 116 and the non-infected network device 118, and the logical bypass network 104 may be configured to transmit the anti-viral agent 112 from the infected network device 116 to the non-infected network device 118 in a lesser amount of time than the communications network 102, where the network path may include the end-to-end transmission therebetween, and the end-to-end transmission may include a plurality of point-to-point transmissions between particular, connected devices of the communications network 102.

At the operation 1504 the anti-viral agent may be distributed onto the communications network using the bypass network, wherein the bypass network may be configured to provide transmission of the anti-viral agent using a bypass transmission medium supporting a higher bandwidth than a communications transmission medium used by the communications network. For example, the communications network 102 may include a plurality of network devices connected by Ethernet and may support a certain data throughput, while the physical bypass network 106 may comprise a plurality of network devices connected by fiber and may support some larger data throughput.

At the operation 1506, the anti-viral agent may be distributed onto the communications network using the bypass network, wherein the bypass network may be configured to provide transmission of the anti-viral agent using a bypass transmission medium supporting faster data transfer than a communications transmission medium used by the communications network. For example, the communications network 102 may include a plurality of network devices connected by Ethernet and may support a certain transmission speed, while the physical bypass network 106 may comprise a plurality of network devices connected by fiber and may support some higher transmission speed.

Figure 16:
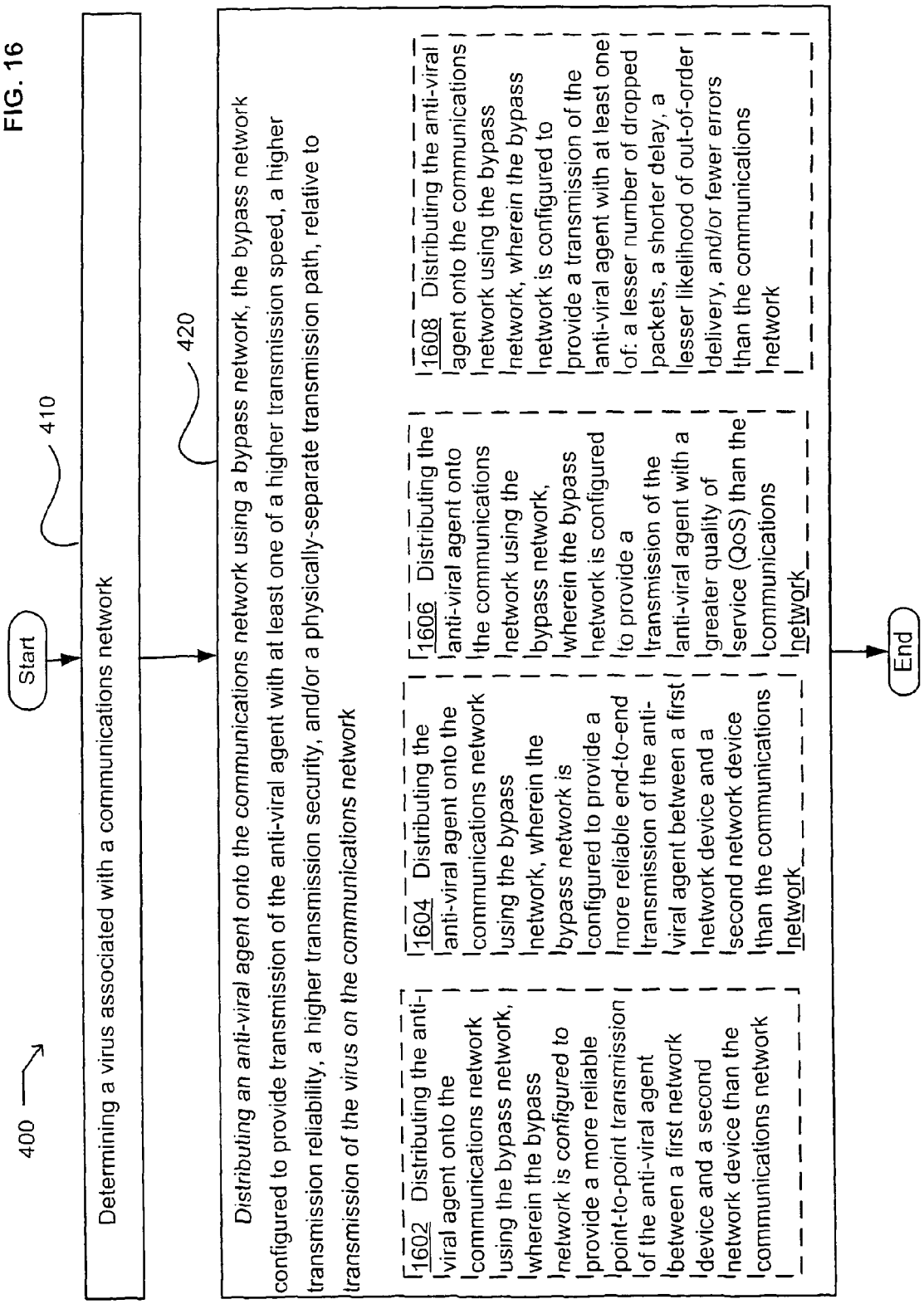
FIG. 16 illustrates an alternative embodiment of the example operational flow of FIG. 4.

FIG. 16 illustrates alternative embodiments of the example operational flow 400 of FIG. 4. FIG. 16 illustrates example embodiments where the distributing operation 420 may include at least one additional operation. Additional operations may include an operation 1602, an operation 1604, an operation 1606, and/or an operation 1608.

At the operation 1602, the anti-viral agent may be distributed onto the communications network using the bypass network, wherein the bypass network is configured to provide a more reliable point-to-point transmission of the anti-viral agent between a first network device and a second network device than the communications network. For example, the logical bypass network 104 may include some or all of the same physical devices of the communications network 102, but may be logically connected in different ways. Thus, the communications network 102 may transmit the virus 108 from a first network device to a second network device with a certain effective degree of reliability, while the logical bypass network 104 may transmit the anti-viral agent 112 from the first network device to the second network device with a relatively greater effective reliability.

At the operation 1604, the anti-viral agent may be distributed onto the communications network using the bypass network, wherein the bypass network may be configured to provide a more reliable end-to-end transmission of the anti-viral agent between a first network device and a second network device than the communications network. For example, there may be a network path between the infected network device 116 and the non-infected network device 118, and the logical bypass network 104 may be configured to transmit the anti-viral agent 112 from the infected network device 116 to the non-infected network device 118 with a higher effective reliability than the communications network 102, where the network path may include the end-to-end transmission therebetween, and the end-to-end transmission may include a plurality of point-to-point transmissions between particular, connected devices of the communications network 102.

At the operation 1606, the anti-viral agent may be distributed onto the communications network using the bypass network, wherein the bypass network is configured to provide a transmission of the anti-viral agent with a greater quality of service (QoS) than the communications network. For example, the immunization system 110 may specifically select the logical bypass network 104 from a plurality of possible logical bypass networks as providing a greater QoS.

At the operation 1608, the anti-viral agent may be distributed onto the communications network using the bypass network, wherein the bypass network may be configured to provide a transmission of the anti-viral agent with at least one of: a lesser number of dropped packets, a shorter delay, a lesser likelihood of out-of-order delivery, and/or fewer errors than the communications network. For example, as just described, the immunization system 110 may specifically select the logical bypass network 104 from a plurality of possible logical bypass networks as providing one or more of the above features, or other features related to an increased effective reliability.

Figure 17:
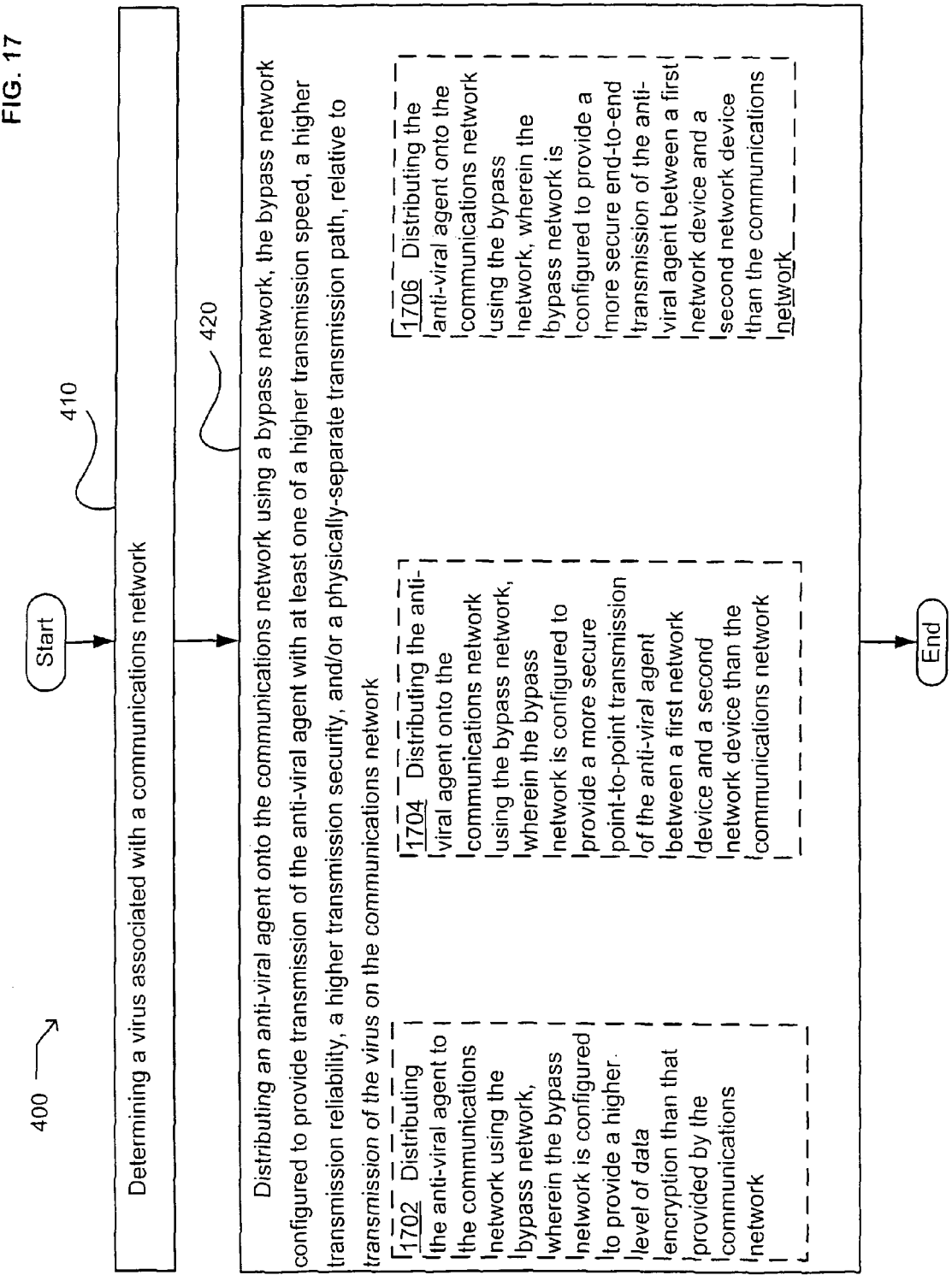
FIG. 17 illustrates an alternative embodiment of the example operational flow of FIG. 4.

FIG. 17 illustrates alternative embodiments of the example operational flow 400 of FIG. 4. FIG. 17 illustrates example embodiments where the distributing operation 420 may include at least one additional operation. Additional operations may include an operation 1702, an operation 1704, and/or an operation 1706.

At the operation 1702, the anti-viral agent may be distributed to the communications network using the bypass network, wherein the bypass network may be configured to provide a higher level of data encryption than that provided by the communications network. For example, the communications network 102 may provide 32-bit data encryption for data being transferred between a first and a second network device. Then, for example, the logical bypass network 104 and/or the physical bypass network 106 may provide 64-bit data encryption for data being transferred between a first and a second network device.

At the operation 1704, the anti-viral agent may be distributed onto the communications network using the bypass network, wherein the bypass network may be configured to provide a more secure point-to-point transmission of the anti-viral agent between a first network device and a second network device than the communications network. For example, the logical bypass network 104 may include some or all of the same physical devices of the communications network 102, but may be logically connected in different ways. Thus, the communications network 102 may transmit the virus 108 from a first network device to a second network device with a certain effective degree of security, while the logical bypass network 104 may transmit the anti-viral agent 112 from the first network device to the second network device with a relatively greater effective security.

At the operation 1706 the anti-viral agent is distributed onto the communications network using the bypass network, wherein the bypass network is configured to provide a more secure end-to-end transmission of the anti-viral agent between a first network device and a second network device than the communications network. For example, there may be a network path between the infected network device 116 and the non-infected network device 118, and the logical bypass network 104 may be configured to transmit the anti-viral agent 112 from the infected network device 116 to the non-infected network device 118 with a higher effective security than the communications network 102, where the network path may include the end-to-end transmission therebetween, and the end-to-end transmission may include a plurality of point-to-point transmissions between particular, connected devices of the communications network 102.

Figure 18:
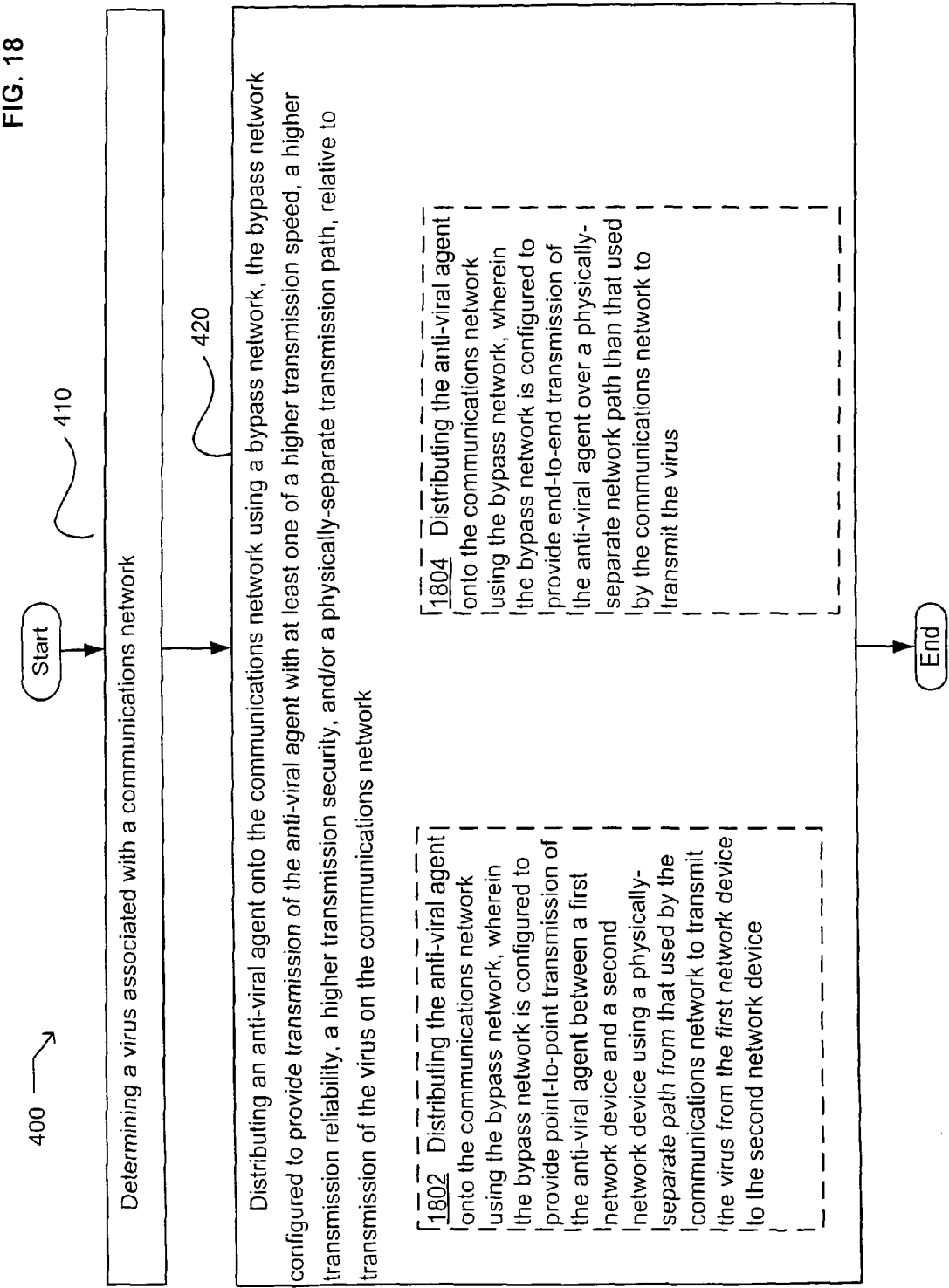
FIG. 18 illustrates an alternative embodiment of the example operational flow of FIG. 4.

FIG. 18 illustrates alternative embodiments of the example operational flow 400 of FIG. 4. FIG. 18 illustrates example embodiments where the distributing operation 420 may include at least one additional operation. Additional operations may include an operation 1802 and/or an operation 1804.

At the operation 1802, the anti-viral agent may be distributed onto the communications network using the bypass network, wherein the bypass network may be configured to provide point-to-point transmission of the anti-viral agent between a first network device and a second network device using a physically-separate path from that used by the communications network to transmit the virus from the first network device to the second network device. For example, the communications network 102 may transmit the virus 108 point-to-point between two network devices using a first physical path (e.g., a wired path). Meanwhile, the physical bypass network 106 may transmit the anti-viral agent 112 point-to-point between the two network devices using a second, physically-separate path (e.g., a wireless path, perhaps over a cellular network or satellite network).

At the operation 1804, the anti-viral agent may be distributed onto the communications network using the bypass network, wherein the bypass network may be configured to provide end-to-end transmission of the anti-viral agent over a physically-separate network path than that used by the communications network to transmit the virus. For example, there may be a network path (e.g., a wired network path) between the infected network device 116 and the non-infected network device 118, and the physical bypass network 106 may be configured to transmit the anti-viral agent 112 from the infected network device 116 to the non-infected network device 118 over a physically separate network path (e.g., a wireless network path), where the physically separate network path may include the end-to-end transmission therebetween.

Figure 19:
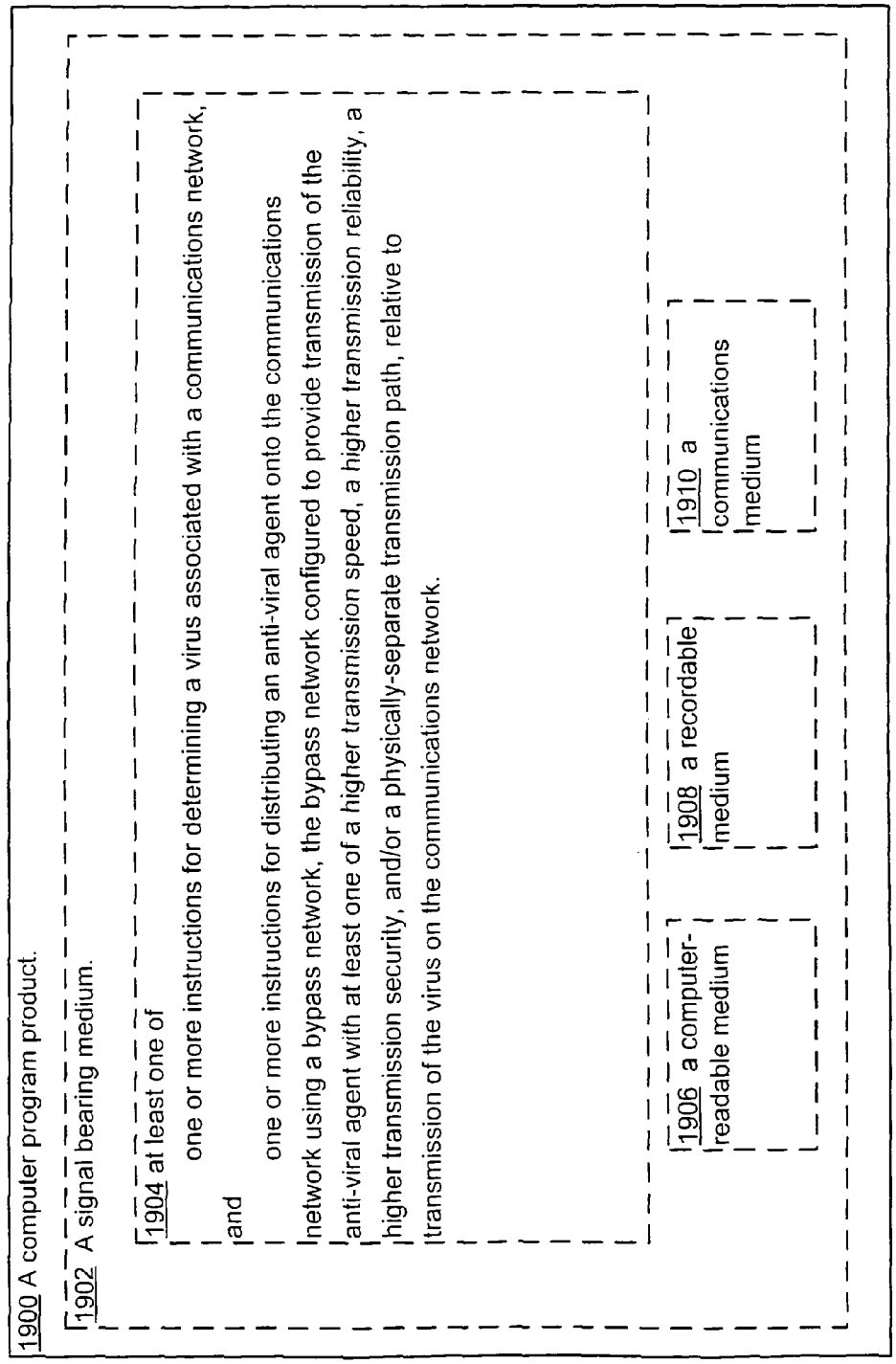
FIG. 19 illustrates a partial view of an example computer program product that includes a computer program for executing a computer process on a computing device.

FIG. 19 illustrates a partial view of an example computer program product 1900 that includes a computer program 1904 for executing a computer process on a computing device. An embodiment of the example computer program product 1900 is provided using a signal bearing medium 1902, and may include at least one of one or more instructions for determining a virus associated with a communications network, and the signal bearing medium also bearing one or more instructions for distributing an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network. The one or more instructions may be, for example, computer executable and/or logic-implemented instructions. In one implementation, the signal-bearing medium 1902 may include a computer-readable medium 1906. In one implementation, the signal bearing medium 1902 may include a recordable medium 1908. In one implementation, the signal bearing medium 1902 may include a communications medium 1910.

Figure 20:
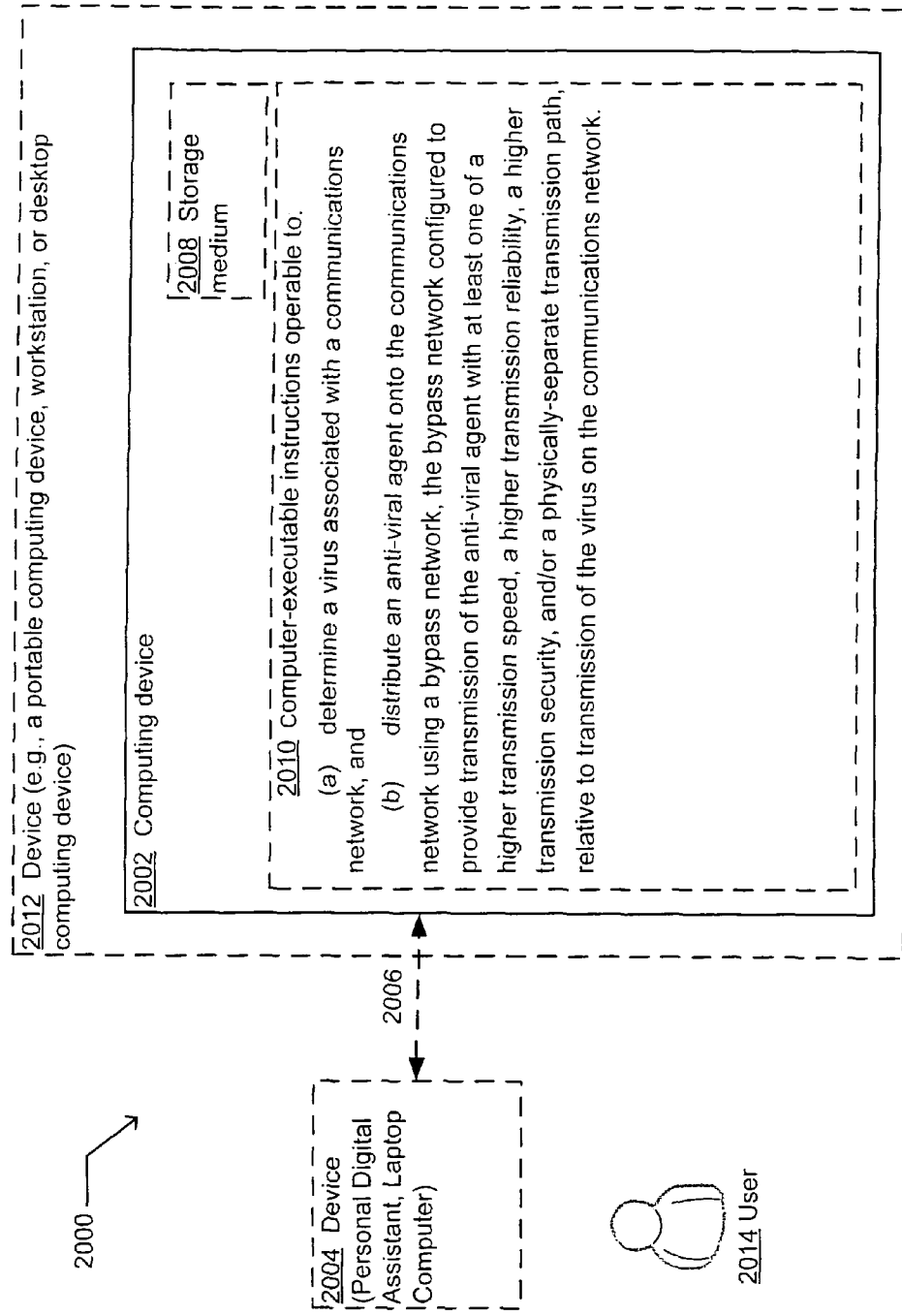
FIG. 20 illustrates an example system in which embodiments may be implemented.

FIG. 20 illustrates an example system 2000 in which embodiments may be implemented. The system 2000 includes a computing system environment. The system 2000 also illustrates the user 2014 using a device 2004, which is optionally shown as being in communication with a computing device 2002 by way of an optional coupling 2006. The optional coupling 2006 may represent a local, wide-area, or peer-to-peer network, or may represent a bus that is internal to a computing device (e.g., in example embodiments in which the computing device 2002 is contained in whole or in part within the device 2004). A storage medium 2008 may include virtually any computer storage media.

The computing device 2002 includes computer-executable instructions 2010 that when executed on the computing device 2002 cause the computing device 2002 to determine a virus associated with a communications network, and distribute an anti-viral agent onto the communications network using a bypass network, the bypass network configured to provide transmission of the anti-viral agent with at least one of a higher transmission speed, a higher transmission reliability, a higher transmission security, and/or a physically-separate transmission path, relative to transmission of the virus on the communications network.

In FIG. 20, then, the system 2000 includes at least one computing device (e.g., 2002 and/or 2004). The computer-executable instructions 2010 may be executed on one or more of the at least one computing device. For example, the computing device 2002 may implement the computer-executable instructions 2010 and output a result to (and/or receive data from) the computing device 2004. Since the computing device 2002 may be wholly or partially contained within the computing device 2004, the computing device 2004 also may be said to execute some or all of the computer-executable instructions 2010, in order to be caused to perform or implement, for example, various ones of the techniques described herein, or other techniques.

The device 2004 may include, for example, one or more of a server, a personal digital assistant (PDA) or cell phone, a laptop computer, a tablet personal computer, a networked computer, a computing system comprised of a cluster of processors, a workstation computer, and/or a desktop computer. In another example embodiment, the device 2004 may be operable to provide the anti-viral agent to the communications network and prevent, reduce, or inhibit propagation of the virus thereon, using the bypass network.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used; in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method at least partially implemented using a processing device, comprising:
    determining a virus associated with a communications network; and
    distributing an anti-viral agent onto the communications network using a bypass network,
    The bypass network configured to provide transmission of the anti-viral agent with at least one physically-separate transmission path, relative to transmission of the virus on the communications network, wherein the distributing comprises providing the anti-viral agent to the communications network based on a determination of a potential path of the virus, the determination based on a topological analysis of the communications network.

2. The method of claim 1 wherein determining a virus associated with a communications network comprises:
    detecting an effect of the virus with respect to the communications network.

3. The method of claim 1 wherein determining a virus associated with a communications network comprises:
    receiving a notification of the virus from a virus detection program; and
    determining the virus, based on the notification.

4. The method of claim 1 wherein determining a virus associated with a communications network comprises:
    determining a fault pattern associated with the virus and/or with the communications network; and
    determining the virus, based on the fault pattern.

5. The method of claim 1 wherein determining a virus associated with a communications network comprises:
    performing a comparison of an expected characteristic of the communications network with an actual characteristic of the communications network; and
    determining the virus, based on the comparison.

6. The method of claim 1 wherein determining a virus associated with a communications network comprises:
    determining the virus associated with the communications network, the communications network including an entity-assured network.

7. The method of claim 1 wherein determining a virus associated with a communications network comprises:
    determining the virus associated with the communications network, the communications network including a subset of a larger network, and provided in association with the larger network.

8. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
    providing the anti-viral agent to a network device of the communications network in advance of an infection of the network device by the virus, using the bypass network.

9. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
    providing a reference to the anti-viral agent to a network device of the communications network, wherein the reference provides access to the anti-viral agent.

10. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
    distributing the anti-viral agent onto the communications network using the bypass network, wherein the bypass network is at least partially logically separate from the communications network.

11. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
    distributing the anti-viral agent onto the communications network using the bypass network, wherein the bypass network is associated with an entity sponsorship thereof.

12. The method of claim 1 wherein distributing an anti-viral agent onto the communications network using a bypass network, the bypass network configured to provide transmission of the anti-viral agent with at least one physically-separate further transmission path, relative to transmission of the virus on the communications network comprises:
    distributing the anti-viral agent onto the communications network using the bypass network, wherein the bypass network is associated with sponsorship by an entity, the sponsorship including assurance and/or provision of the transmission of the anti-viral agent with the at least one of the higher transmission speed, the higher transmission reliability, the higher transmission security, and/or the physically-separate transmission path.

13. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
    distributing the anti-viral agent onto the communications network using the bypass network, using a network device that is in communications with both the communications network and the bypass network.

14. The method of claim 1 wherein distributing an anti-viral agent onto the communications network using a bypass network, the bypass network configured to provide transmission of the anti-viral agent with at least one of physically-separate transmission path, relative to transmission of the virus on the communications network further comprises:

distributing the anti-viral agent onto the communications network using the bypass network, using a network traffic management device that is operable to implement rules governing the distributing of the anti-viral agent onto the communications network.

15. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, using a network traffic management device that is operable to prioritize transmission of the anti-viral agent with respect to communications data of the communications network.

16. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, using a network traffic management device that is operable to suppress and/or delay transmission of the virus relative to transmission of the anti-viral agent.

17. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, the bypass network including at least one of: a local area network, a virtual local area network, a virtual private network, a peer-to-peer network, and/or an intranet.

18. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, the bypass network including at least one of: a satellite network, a satellite radio network, a cellular network, and/or a paging network.

19. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, the bypass network configured to provide transmission of the anti-viral agent with at least one higher transmission reliability wherein the bypass network is configured to provide a more reliable point-to-point transmission of the anti-viral agent between a first network device and a second network device than the communications network.

20. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, the bypass network is configured to provide transmission of the anti-viral agent with at least one higher transmission reliability wherein they bypass network is configured to provide a more reliable end-to-end transmission of the anti-viral agent between a first network device and a second network device than the communications network.

21. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, wherein the bypass network is configured to provide transmission of the anti-viral agent using a bypass transmission with a greater quality of service (QoS) than the communication network.

22. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, wherein the bypass network is configured to provide a transmission of the anti-viral agent with at least one of: a lesser number of dropped packets, a shorter delay, a lesser likelihood of out-of-order delivery, and/or fewer errors than the communications network.

23. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent to the communications network using the bypass network, wherein the bypass network is configured to provide a higher level of data encryption than that provided by the communications network.

24. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, wherein the bypass network is configured to provide a more secure point-to-point transmission of the anti-viral agent between a first network device and a second network device than the communications network.

25. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:

distributing the anti-viral agent onto the communications network using the bypass network, wherein the bypass network is configured to provide a more secure end-to-end transmission of the anti-viral agent between a first network device and a second network device than the communications network.

26. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
   distributing the anti-viral agent onto the communications network using the bypass network, wherein the bypass network is configured to provide point-to-point transmission of the anti-viral agent between a first network device and a second network device using a physically-separate path from that used by the communications network to transmit the virus from the first network device to the second network device.

27. The method of claim 1 wherein distributing an anti-viral agent onto the communications network using a bypass network, the bypass network configured to provide transmission of the anti-viral agent with at least one physically-separate transmission path, relative to transmission of the virus on the communications network further comprises:
   distributing the anti-viral agent onto the communications network using the bypass network, wherein the bypass network is configured to provide end-to-end transmission of the anti-viral agent over a physically-separate network path than that used by the communications network to transmit the virus.

28. A computer program product comprising:
A non-transitory computer-readable medium bearing at least one of
(a) one or more instructions for determining a virus associated with a communications network, and
(b) one or more instructions for distributing a anti-viral agent onto the communications network using a bypass network, the bypass network configured to provide transmission of the anti-viral agent with at least one physically-separate transmission path, relative to transmission of the virus on the communications network, wherein the distributing the anti-viral agent onto the communications network is based on a determination of a potential path of the virus, wherein the determination includes a statistical analysis of the determination.

29. A system comprising:
a computer device, and
Instructions that when executed on the computing device cause the computing device to
(a) determine a virus associated with a communications network, and
(b) distribute an anti-viral agent onto the communications network using a bypass network, the bypass network configured to provide transmission of the anti-viral agent with at least one physically-separate transmission path, relative to transmission of the virus on the communications network, wherein the distributing the anti-viral agent onto the communications network is based on a determination of a potential path of the virus, wherein the determination includes a statistical analysis of the determination.

30. A device comprising:
a multi-network virus immunization system, the multi-network virus immunization system comprising
(a) a network monitor operable to determine a virus associated with a communications network, and
(b) a response generator operable to:
select an anti-viral agent from more than one possible anti-viral agents, the selection based upon one or more response rules; and
distribute the anti-viral agent onto the communications network using a bypass network, the bypass network configured to:
provide transmission of the anti-viral agent with at least one physically-separate transmission path, relative to transmission of the virus on the communications network, and
provide a more secure point-to-point transmission of the anti-viral agent between a first network device and a second network device.

31. The device of claim 30 wherein the response generator is further operable to implement the one or more response rules associated with determining the anti-viral agent and providing the anti-viral agent to the communications system using the bypass network.

* * * * *

UNITED STATES PATENT AND TRADEMARK OFFICE
CERTIFICATE OF CORRECTION

PATENT NO. : 8,146,161 B2
APPLICATION NO. : 11/492689
DATED : March 27, 2012
INVENTOR(S) : Jung et al.

Page 1 of 1

It is certified that error appears in the above-identified patent and that said Letters Patent is hereby corrected as shown below:

In the Claims:

Column 34, line 5, claim 29: "a computer device, and" should read --a computer device; and--

Column 34, line 22, claim 30: "network virus immunization system comprising" should read --network virus immunization system comprising:--

Signed and Sealed this
Sixteenth Day of April, 2013

Teresa Stanek Rea
*Acting Director of the United States Patent and Trademark Office*